US007505930B2

(12) United States Patent
Senga

(10) Patent No.: US 7,505,930 B2
(45) Date of Patent: Mar. 17, 2009

(54) SALES SYSTEM IN COMMUNICATION NETWORK

(76) Inventor: Tsuyoshi Senga, 9-3-10, Iwanaridai, Kasugai-shi, Aichi-ken (JP)

(*) Notice: Subject to any disclaimer, the term of this patent is extended or adjusted under 35 U.S.C. 154(b) by 996 days.

(21) Appl. No.: 10/858,151

(22) Filed: Jun. 1, 2004

(65) Prior Publication Data

US 2004/0230518 A1 Nov. 18, 2004

Related U.S. Application Data

(63) Continuation of application No. 09/789,257, filed on Feb. 20, 2001, now abandoned.

(30) Foreign Application Priority Data

Feb. 22, 2000 (JP) ............................ 2000-45226
May 1, 2000 (JP) ............................ 2000-133037
Oct. 17, 2000 (JP) ............................ 2000-316996

(51) Int. Cl.
*G06Q 30/00* (2006.01)

(52) U.S. Cl. ............................ 705/26; 705/27; 705/37

(58) Field of Classification Search .................. 705/26, 705/37, 27
See application file for complete search history.

(56) References Cited

U.S. PATENT DOCUMENTS 5,136,501 A * 8/1992 Silverman et al. ............ 705/37
5,787,402 A 7/1998 Potter et al.
5,809,483 A 9/1998 Broka et al.
6,023,685 A 2/2000 Brett et al.
6,067,532 A 5/2000 Gebb
6,343,278 B1 * 1/2002 Jain et al. ................ 705/36 R
6,418,419 B1 7/2002 Nieboer et al.
2007/0118440 A1 * 5/2007 Etkin ......................... 705/26

* cited by examiner

*Primary Examiner*—Yogesh C Garg
(74) *Attorney, Agent, or Firm*—Burr & Brown

(57) ABSTRACT

The invention provides a sales system in a communication network whereby a mediator in the network permits a purchaser the opportunity to purchase his desired commodity for a lowest possible price and a seller the opportunity to sell the same commodity as much as possible. The mediator can receive bids from both of a purchase wisher and a sales wisher to announce the bidding results with no limits in period and receive changes in the bidding conditions until transaction conclusion, thus changing conditions based on the transaction conclusion state to provide lowest possible purchase prices and highest possible sales prices.

12 Claims, 14 Drawing Sheets

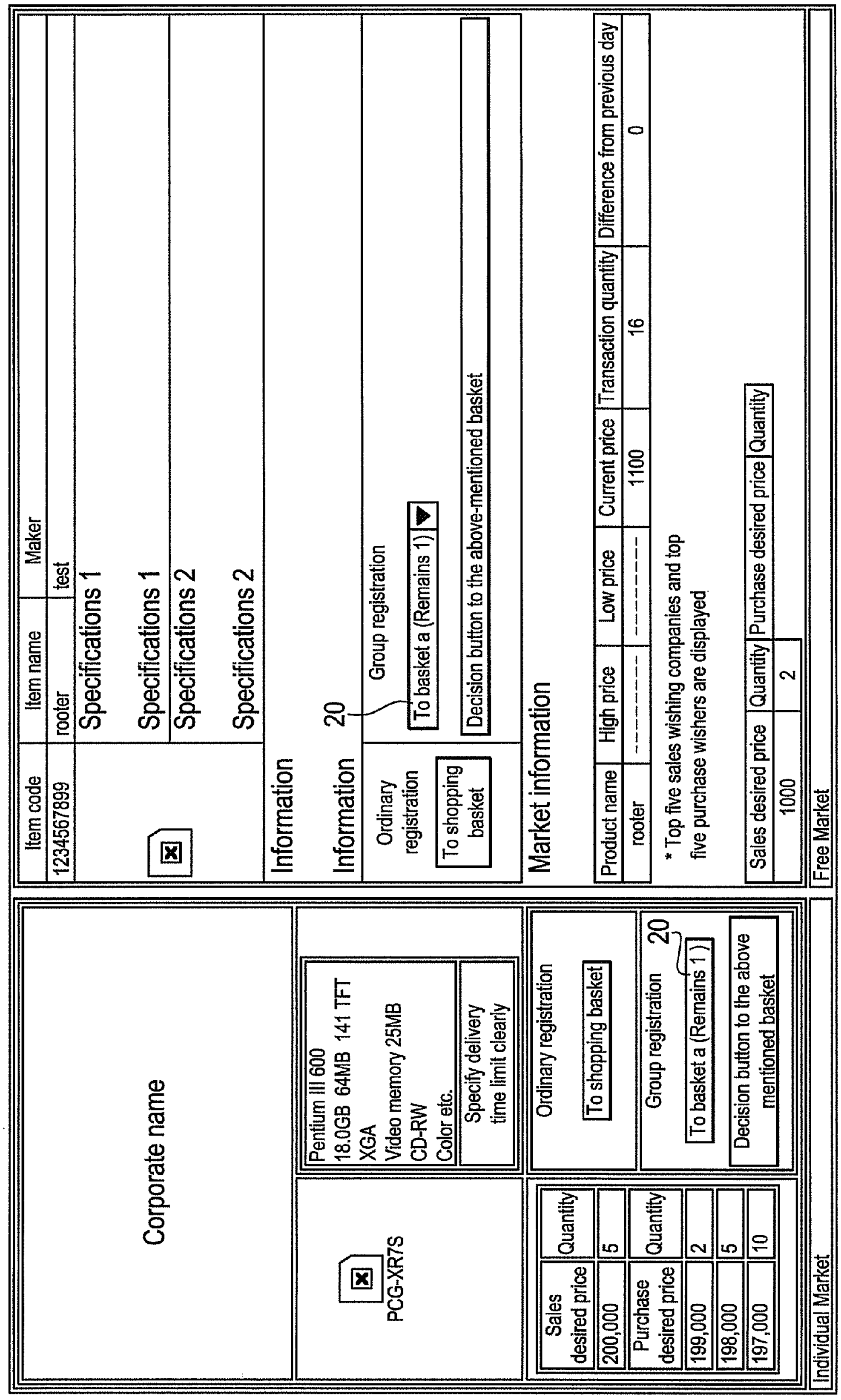

FIG. 4

| Item code | Item name | Maker |
|---|---|---|
| 1234567899 | rooter | test |

☒ Specifications 1
Specifications 1
Specifications 2
Specifications 2

Information

Information

Ordinary registration — [To shopping basket]

Group registration — 20
[To basket a (Remains 1) ▶]

Decision button to the above-mentioned basket

Market information

| Product name | High price | Low price | Current price | Transaction quantity | Difference from previous day |
|---|---|---|---|---|---|
| rooter | --- | --- | 1100 | 16 | 0 |

* Top five sales wishing companies and top five purchase wishers are displayed

| Sales desired price | Quantity | Purchase desired price | Quantity |
|---|---|---|---|
| 1000 | 2 | | |

Free Market

---

Corporate name

☒ PCG-XR7S

Pentium III 600
18.0GB 64MB 141 TFT
XGA
Video memory 25MB
CD-RW
Color etc.

Specify delivery time limit clearly

Ordinary registration
[To shopping basket]

Group registration — 20
[To basket a (Remains 1)]

Decision button to the above mentioned basket

| Sales desired price | Quantity |
|---|---|
| 200,000 | 5 |

| Purchase desired price | Quantity |
|---|---|
| 199,000 | 2 |
| 198,000 | 5 |
| 197,000 | 10 |

Individual Market

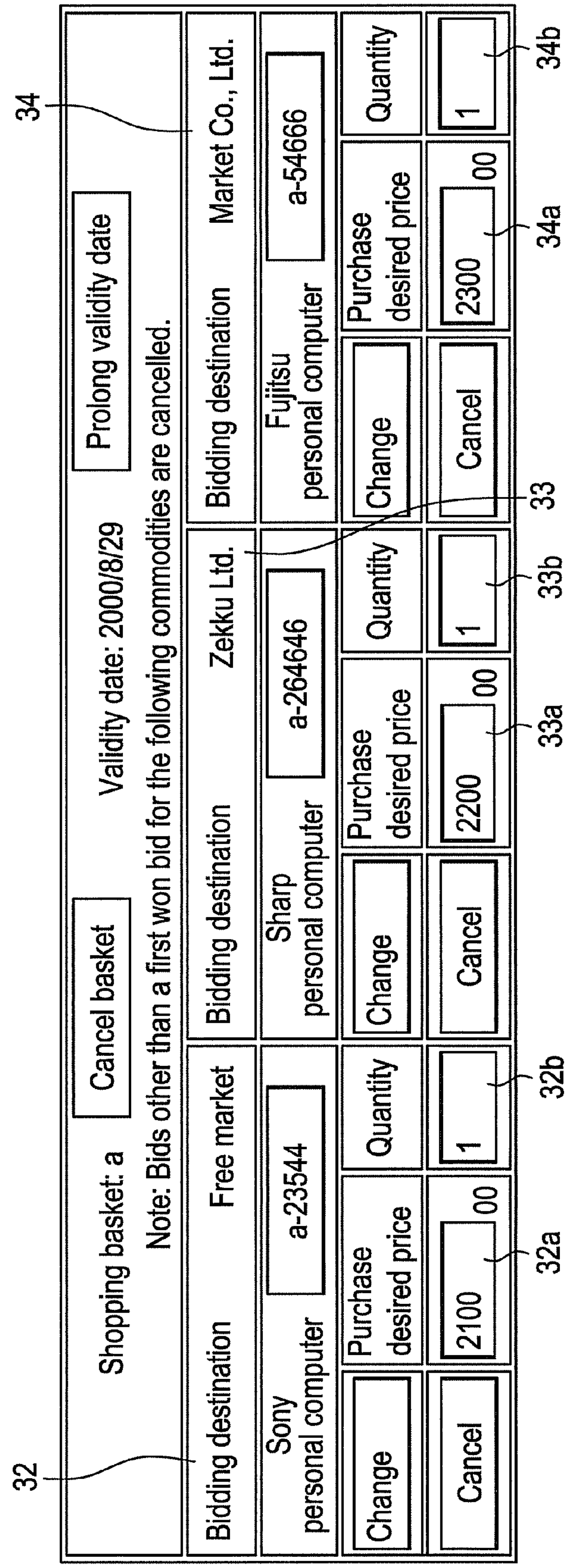

FIG. 5

| Shopping basket: a | Cancel basket | Validity date: 2000/8/29 | Prolong validity date |

Note: Bids other than a first won bid for the following commodities are cancelled.

| Bidding destination | Free market | Bidding destination | Zekku Ltd. | Bidding destination | Market Co., Ltd. |
|---|---|---|---|---|---|
| Sony personal computer | a-23544 | Sharp personal computer | a-264646 | Fujitsu personal computer | a-54666 |
| Purchase desired price | Quantity | Purchase desired price | Quantity | Purchase desired price | Quantity |
| 2100 00 | 1 | 2200 00 | 1 | 2300 00 | 1 |
| Change | | Change | | Change | |
| Cancel | | Cancel | | Cancel | |

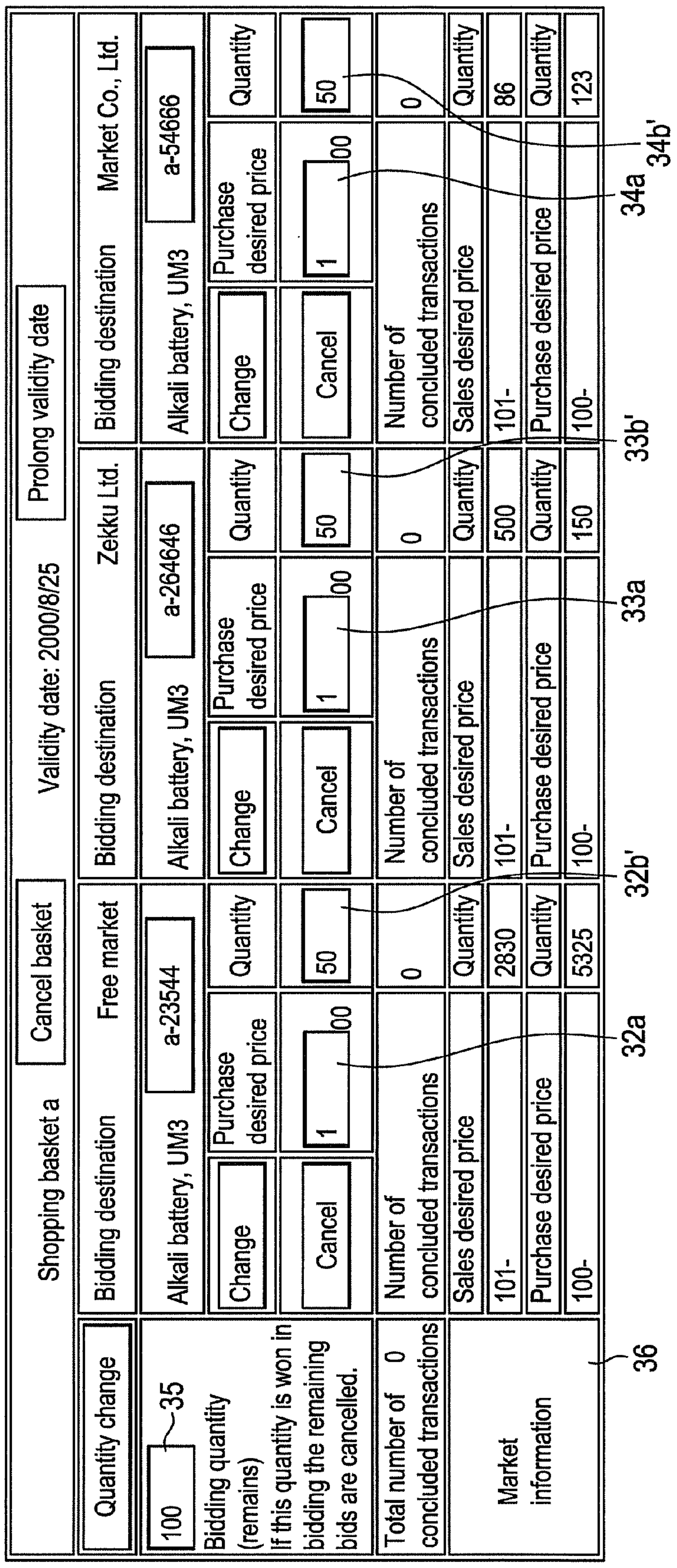

FIG. 6

| Quantity change | Shopping basket a | | Cancel basket | Validity date: 2000/8/25 | | Prolong validity date | |
|---|---|---|---|---|---|---|---|
| | Bidding destination | Free market | | Bidding destination | Zekku Ltd. | Bidding destination | Market Co., Ltd. |
| 100 — 35 | Alkali battery, UM3 | a-23544 | | Alkali battery, UM3 | a-264646 | Alkali battery, UM3 | a-54666 |
| Bidding quantity (remains) | Change | Purchase desired price | Quantity | Change | Purchase desired price | Quantity | Change | Purchase desired price | Quantity |
| If this quantity is won in bidding the remaining bids are cancelled. | Cancel | 1  00 | 50 | Cancel | 1  00 | 50 | Cancel | 1  00 | 50 |
| Total number of 0 concluded transactions | Number of concluded transactions | | 0 | Number of concluded transactions | | 0 | Number of concluded transactions | | 0 |
| | Sales desired price | | Quantity | Sales desired price | | Quantity | Sales desired price | | Quantity |
| | 101- | | 2830 | 101- | | 500 | 101- | | 86 |
| | Purchase desired price | | Quantity | Purchase desired price | | Quantity | Purchase desired price | | Quantity |
| Market information | 100- | | 5325 | 100- | | 150 | 100- | | 123 |

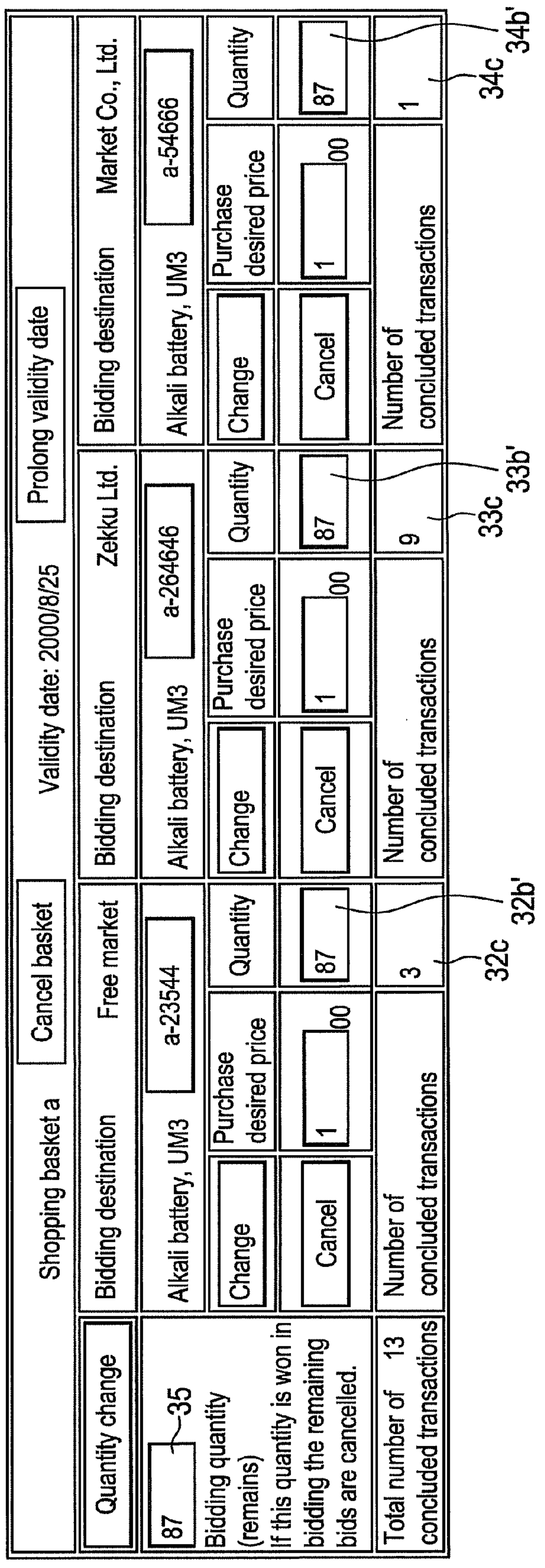

FIG. 7

| Shopping basket a | | Cancel basket | | Validity date: 2000/8/25 | | Prolong validity date | | |
|---|---|---|---|---|---|---|---|---|
| Bidding destination | | Free market | a-23544 | Bidding destination | | Zekku Ltd. | a-264646 | |
| Alkali battery, UM3 | Purchase desired price | | Quantity | Alkali battery, UM3 | Purchase desired price | | Quantity | |
| Change | 1 | 00 | 87 | Change | 1 | 00 | 87 | |
| Cancel | | | | Cancel | | | | |
| Number of concluded transactions | | | 3 | Number of concluded transactions | | | 9 | |

| | | Bidding destination | | Market Co., Ltd. | a-54666 |
|---|---|---|---|---|---|
| | | Alkali battery, UM3 | Purchase desired price | | Quantity |
| | | Change | 1 | 00 | 87 |
| | | Cancel | | | |
| | | Number of concluded transactions | | | 1 |

Quantity change
87  35
Bidding quantity (remains)
If this quantity is won in bidding the remaining bids are cancelled.
Total number of 13 concluded transactions

FIG. 8

| Purchaser code | Market type | 1 | 2 | 3 | Paying type | 1 | 2 | 3 |
|---|---|---|---|---|---|---|---|---|
| katozou | | Free market | Individual sales | Individual purchase | | Transfer | Cash on delivery | Credit |

| Management No. | Item code (Link to commodity details) | | Commodity name | Transaction concluded date | Purchaser code (link to purchaser) | Concluded price | Quantity | Delivery fee | Consumption tax | Total amount | Pay | Payment check | Delivery check |
|---|---|---|---|---|---|---|---|---|---|---|---|---|---|
| 10-001 | N01-001 | 1 | ZECZEC | 2000/8/17 15:33:33 | AAAAA | 20000 | 2 | 1000 | 2050 | 43050 | 1 | ☑ 2008/8/18 15:33:33 | ☑ 2008/8/19 16:30:00 |
| 10-002 | F01-001 | 2 | ZECZEC | 2000/8/17 16:00:00 | BBBBB | 21000 | 1 | 500 | 1070 | 22570 | 1 | ☑ 2008/8/18 15:33:33 | ☐ |
| 10-003 | J01-001 | 3 | ZECZEC | 2000/8/18 12:00:00 | CCCCC | 19000 | 1 | 500 | 970 | 20470 | 1 | ☐ | ☐ |

32c
33c
34c

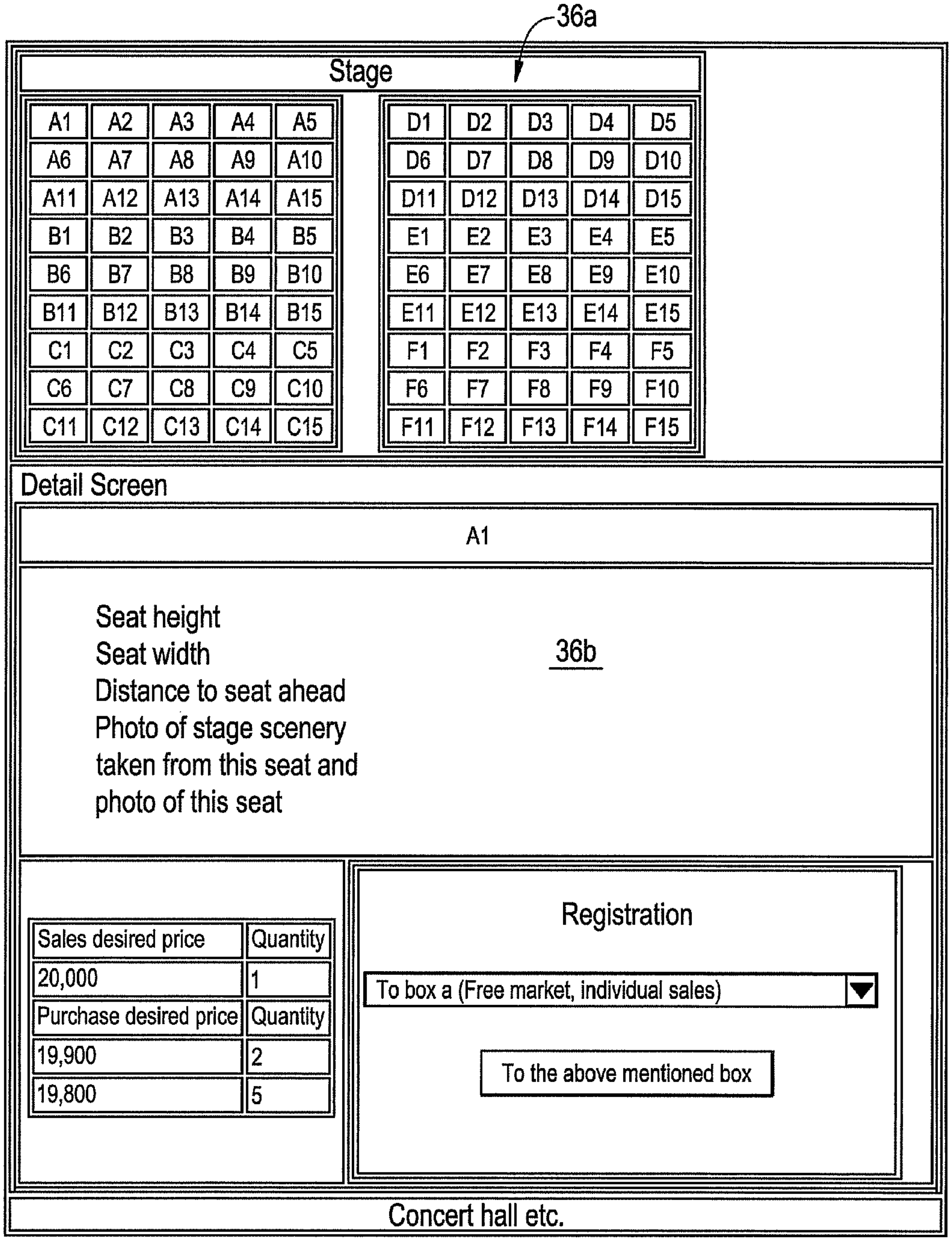

FIG. 9

```
                            ┌─ 36a
                            ▼
┌─────────────────────────────────────────────┐
│                   Stage                     │
├──┬──┬──┬──┬──┬─┬──┬──┬──┬──┬──┐
│A1│A2│A3│A4│A5│ │D1│D2│D3│D4│D5│
│A6│A7│A8│A9│A10│ │D6│D7│D8│D9│D10│
│A11│A12│A13│A14│A15│ │D11│D12│D13│D14│D15│
│B1│B2│B3│B4│B5│ │E1│E2│E3│E4│E5│
│B6│B7│B8│B9│B10│ │E6│E7│E8│E9│E10│
│B11│B12│B13│B14│B15│ │E11│E12│E13│E14│E15│
│C1│C2│C3│C4│C5│ │F1│F2│F3│F4│F5│
│C6│C7│C8│C9│C10│ │F6│F7│F8│F9│F10│
│C11│C12│C13│C14│C15│ │F11│F12│F13│F14│F15│
└──┴──┴──┴──┴──┴─┴──┴──┴──┴──┴──┘
```

Detail Screen

| A1 |
|---|

Seat height
Seat width                           36b
Distance to seat ahead
Photo of stage scenery
taken from this seat and
photo of this seat

| Sales desired price | Quantity |
|---|---|
| 20,000 | 1 |
| Purchase desired price | Quantity |
| 19,900 | 2 |
| 19,800 | 5 |

Registration

[ To box a (Free market, individual sales) ▼ ]

[ To the above mentioned box ]

Concert hall etc.

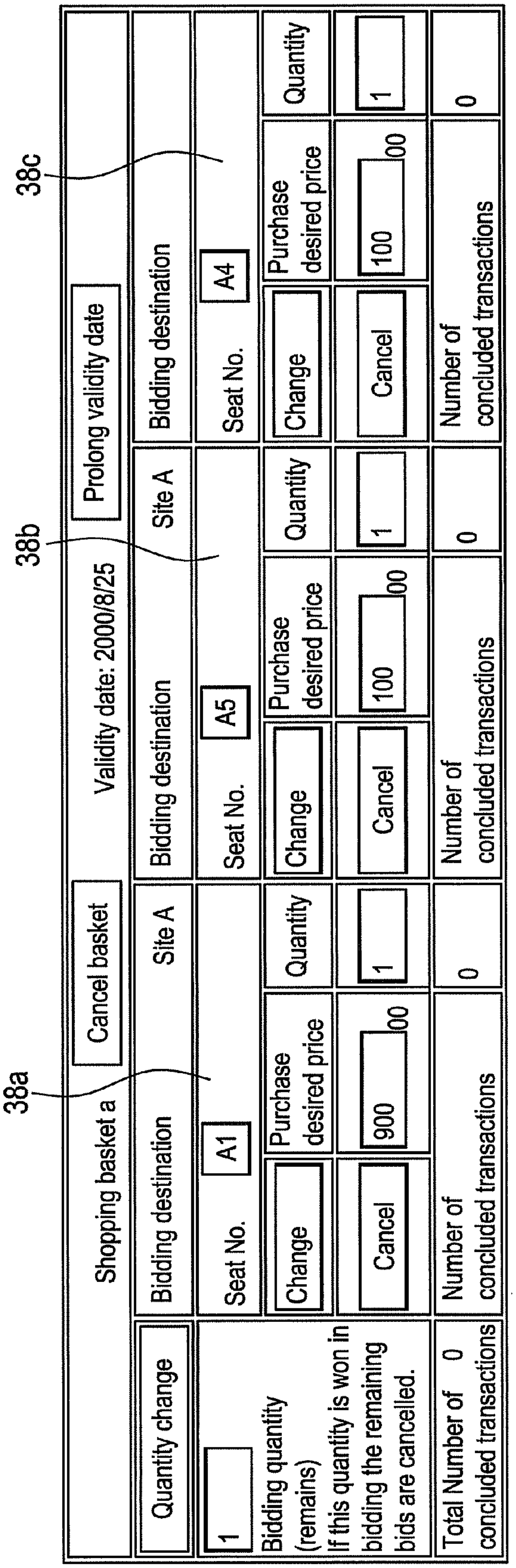

FIG. 11

| Shopping basket a | | Cancel basket | | Validity date: 2000/8/25 | | Prolong validity date | |
|---|---|---|---|---|---|---|---|
| Bidding destination | | Site A | | Bidding destination | | Site A | |
| Seat No. | A1 | Purchase desired price | 900 00 | Seat No. | A5 | Purchase desired price | 100 00 |
| Change | | Quantity | 1 | Change | | Quantity | 1 |
| Cancel | | | | Cancel | | | |
| Number of concluded transactions | 0 | | | Number of concluded transactions | 0 | | |

(continued — 38c)

| Bidding destination | Site A |
| Seat No. | A4 |
| Purchase desired price | 100 00 |
| Change | Quantity 1 |
| Cancel | |
| Number of concluded transactions | 0 |

Quantity change: 1

Bidding quantity (remains)
If this quantity is won in bidding the remaining bids are cancelled.

Total Number of concluded transactions: 0

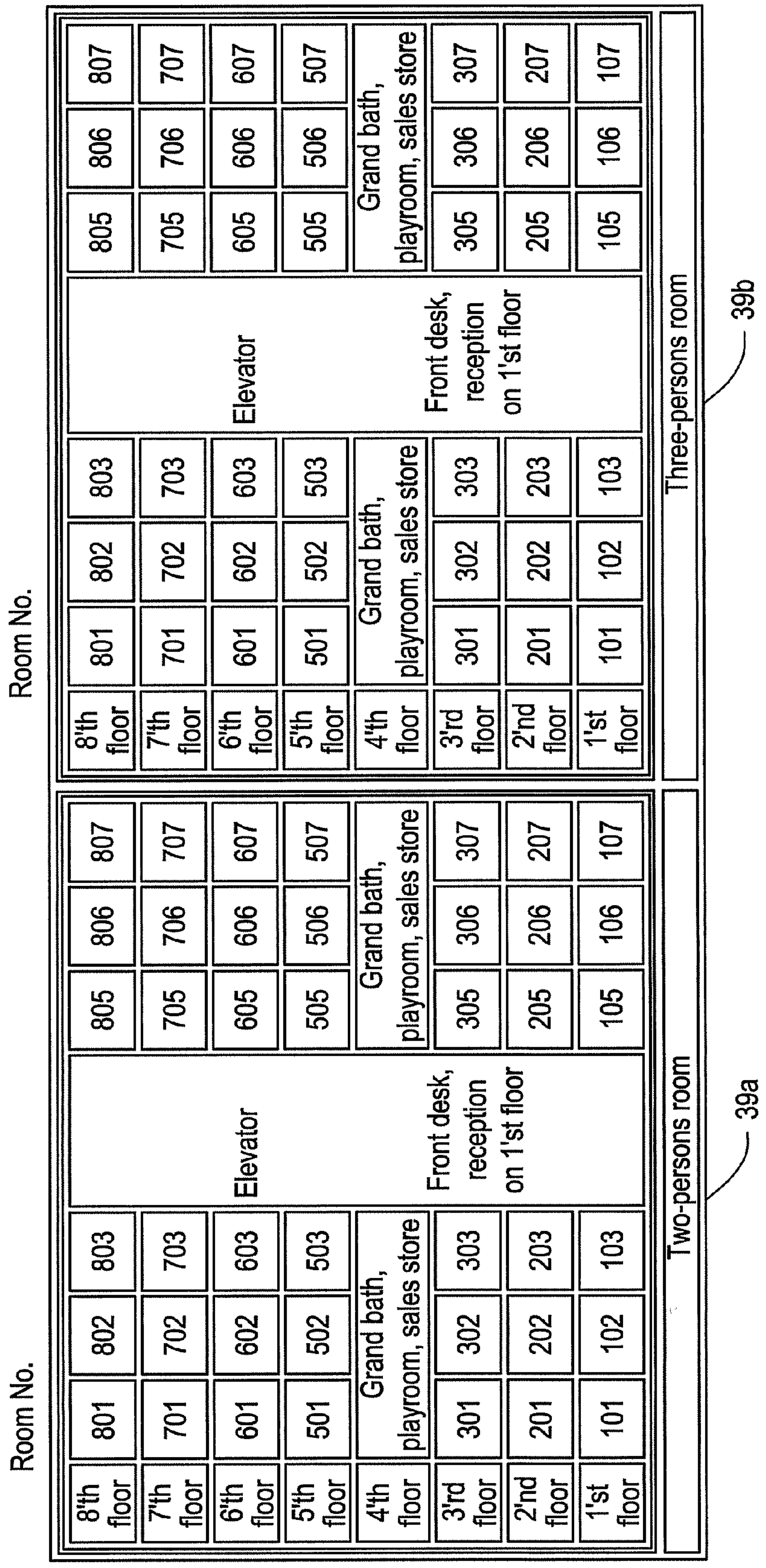

FIG. 12

Two-persons room (39a)

Room No.

| | | | | | | | | |
|---|---|---|---|---|---|---|---|---|
| 8th floor | 801 | 802 | 803 | | 805 | 806 | 807 | |
| 7th floor | 701 | 702 | 703 | Elevator | 705 | 706 | 707 | |
| 6th floor | 601 | 602 | 603 | | 605 | 606 | 607 | |
| 5th floor | 501 | 502 | 503 | | 505 | 506 | 507 | |
| 4th floor | Grand bath, playroom, sales store | | | | Grand bath, playroom, sales store | | | |
| 3rd floor | 301 | 302 | 303 | Front desk, reception on 1st floor | 305 | 306 | 307 | |
| 2nd floor | 201 | 202 | 203 | | 205 | 206 | 207 | |
| 1st floor | 101 | 102 | 103 | | 105 | 106 | 107 | |

Three-persons room (39b)

Room No.

| | | | | | | | | |
|---|---|---|---|---|---|---|---|---|
| 8th floor | 801 | 802 | 803 | | 805 | 806 | 807 | |
| 7th floor | 701 | 702 | 703 | Elevator | 705 | 706 | 707 | |
| 6th floor | 601 | 602 | 603 | | 605 | 606 | 607 | |
| 5th floor | 501 | 502 | 503 | | 505 | 506 | 507 | |
| 4th floor | Grand bath, playroom, sales store | | | | Grand bath, playroom, sales store | | | |
| 3rd floor | 301 | 302 | 303 | Front desk, reception on 1st floor | 305 | 306 | 307 | |
| 2nd floor | 201 | 202 | 203 | | 205 | 206 | 207 | |
| 1st floor | 101 | 102 | 103 | | 105 | 106 | 107 | |

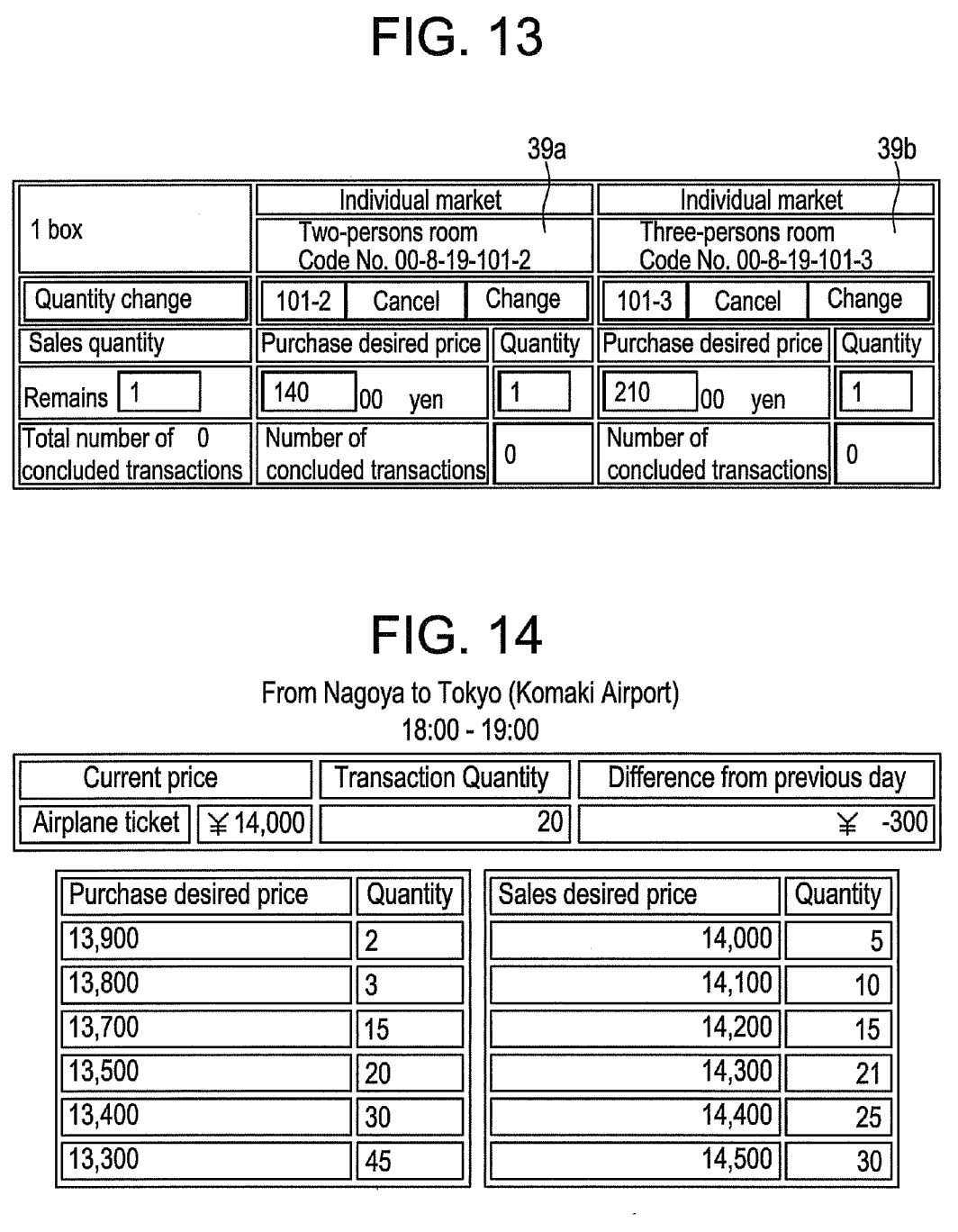

| | | | | |
|---|---|---|---|---|
| 1 box | Individual market<br>Two-persons room<br>Code No. 00-8-19-101-2 | | Individual market<br>Three-persons room<br>Code No. 00-8-19-101-3 | |
| Quantity change | 101-2 \| Cancel \| Change | | 101-3 \| Cancel \| Change | |
| Sales quantity | Purchase desired price | Quantity | Purchase desired price | Quantity |
| Remains 1 | 140 00 yen | 1 | 210 00 yen | 1 |
| Total number of concluded transactions 0 | Number of concluded transactions | 0 | Number of concluded transactions | 0 |

FIG. 14

From Nagoya to Tokyo (Komaki Airport)
18:00 - 19:00

| Current price | | Transaction Quantity | Difference from previous day |
|---|---|---|---|
| Airplane ticket | ¥14,000 | 20 | ¥ -300 |

| Purchase desired price | Quantity |
|---|---|
| 13,900 | 2 |
| 13,800 | 3 |
| 13,700 | 15 |
| 13,500 | 20 |
| 13,400 | 30 |
| 13,300 | 45 |

| Sales desired price | Quantity |
|---|---|
| 14,000 | 5 |
| 14,100 | 10 |
| 14,200 | 15 |
| 14,300 | 21 |
| 14,400 | 25 |
| 14,500 | 30 |

SALES SYSTEM IN COMMUNICATION NETWORK

CROSS REFERENCE TO RELATED APPLICATION

This application is a continuation of U.S. application Ser. No. 09/789,257 filed Feb. 20, 2001, the entirety of which is incorporated herein by reference.

BACKGROUND OF THE INVENTION

1. Field of the Invention

The invention relates to a sales system in a communication network for permitting a mediator in the communication network to mediate between a purchaser and a seller in the trading of commodities.

1. Description of the Related Art

The Internet and other communication networks for communication with a personal computer have recently been rapidly pervading corporate plants as well as general homes, finding wide applications not only as means for receiving and transmitting various types of information but also in the selection, ordering, and sales of various commodities.

In such a communication network, when a desired commodity is to be purchased through a sales system therein, the purchaser confirms the information such as performance, price, etc. of the desired commodity on his computer screen and then inputs and registers their information including address, name, paying method, etc. This information is then transmitted over the communication network to the host computer of the seller, in response to which the commodity is delivered to the address of the purchaser, while the cost is paid by the predetermined method such as credit card or account transfer.

Also, as for an over-the-network sales of a personal computer, for example, there is a so-called auction type sales system or a reverse-auction type sales system available in addition to the communication sales system with a fixed sales price specified by the seller previously discussed. In the auction type sales system, a seller or a mediator sets an initial bid price of a commodity. Purchasers then submit bids on the commodity over the network, not less than the initial bid price. At the end of a predetermined time period, the highest bidder wins the right to purchase the commodity. In the reverse-auction type sales system, a purchaser or a mediator sets an initial bid price of a commodity. Sellers then submit bids on the commodity over the network not more than the initial bid price. At the end of a predetermined time period, the lowest bidder wins the right to sell the commodity.

In the reverse-auction type sales system, in a case where the commodity is a personal computer, for example, typically the number of articles to be sold at a time is small, so that the purchasers may have an advantage where they can purchase a commodity for a price lower than an over-the-counter price or a sales price, while the sellers may have an advantage where they can dispose of lesser-quality inventories in a wider sales market.

In the above-mentioned auction type sales system, however, since the number of articles to be sold is small, the profit of the sellers is relatively low. Also, a seller who would like to sell a large number of the same commodity collectively can often get a satisfactory total profit even if the unit price of the commodity is set considerably lower than a unit cost for a small volume sales. Therefore purchasers may get the commodity at a lesser than usual sales price, thereby benefiting all those involved in the auction.

SUMMARY OF THE INVENTION

It is an object of the invention to provide a sales system in a communication network that solves the above-mentioned problems in facilitating the ability of a purchaser to purchase a commodity at his desired lowest possible price and also to facilitate the ability of a seller to sell a greater quantity of the same commodity.

To this end, a sales system on a communication network according to the preferred embodiment of the invention permits a mediator in the communication network to receive an initial bid from sellers for selling an arbitrary desired commodity at an arbitrary desired sales price and a bid from purchasers for purchasing an arbitrary desired commodity at an arbitrary desired purchase price while posting or presenting their bidding results to both parties. The conditions of previous bids which have been made earlier are always announced, so that if those conditions agreed with conditions of later bidders, the transaction is concluded and the conclusion information is announced and, at the same time, changes in the seller's unconcluded conditions and those in the purchaser's unconcluded conditions are received to announce bidding under thus changed conditions and the unconcluded bidding in order to continuously receive other bids, thus enabling continued participation under their desired conditions.

By this system, the bidding from the buyers and sellers under their desired conditions are always announced throughout the bidding until someone wins a bid at a desired sales price, thus providing both the buyers and sellers with the opportunity to select a bid at their desired lowest or highest possible prices respectively.

Although this system assumes a time difference in the conclusion of the conditions agreed upon at the time of the transaction between setting an initial bid and placing a winning bid, it covers also the case of simultaneous bidding with no time difference between the initial and winning bids to treat it as a transaction.

The invention can pertain to a plurality of products including but not limited to computer software programs and other electric/electronic equipment, foods and other consumables, automobiles, pictures, and other durable consumer goods as well as hardware, real estate, airplane tickets and other transportation tickets, hotel tickets, concert tickets, and other service exchange tickets for sale, bank loan rates and deposit rates, subscription commissions for insurance etc., contracted construction of buildings and civil engineering work, personnel/occupation staffing, and personnel delivery where required workers may be delivered in response to a delivery destination and work under their management in maintained employment relationships and wages contracts. With this, as his desired bidding conditions, a purchaser registers as part of his bid information on the commodity he wishes to purchase, information on the purchaser himself, and a purchase price (initial bid) the purchaser desires to pay for the commodity. The seller registers as part of his bid information on the commodity he wishes to sell, information on the seller himself, and a sales price (initial bid) at which he desires to sell the commodity. In this way, the purchaser or seller bidding in this process specifies his desired commodity and registers his desired purchase price or sales price as a bid, respectively.

When the product is personnel services in particular, the seller (as the service provider) provides detailed information such as personnel performance and achievements, and the desired reward amount. The purchaser (employer side, a corporation in many cases) registers a reward as a bid. If the product is employment opportunities, the seller provides detailed information such as work-place, corporate size, employment conditions, and the reward amount, while on the other hand, a would-be employee as the purchaser of the employment opportunity registers their desired reward amount as a bid against those conditions presented.

Moreover, if the product is a construction contract, the contract provider (seller) registers as part of a bid detailed conditions such as construction materials, required technologies, detailed information such as size and performance of the relevant corporation, and a monetary amount. The contractor (purchaser) then registers a bid against those conditions including the desired monetary amount. Or conversely, the contractor as a seller registers as part of a bid detailed information such as their performance, technology specialties and a monetary amount. The contract provider then registers as part of a bid their desired monetary amount against the bid of the contractor for each order as a purchaser.

Thus, as to services, the side for providing a service as the seller registers as part of a bid information which details the service contents and service provider as well as the service providing charge. The side who wishes to receive the service as a purchaser registers as part of a bid information of the detailed service contents and service receiving side and the price they wish to pay for the service. For each of them, the payable amount is registered as a bid.

Also, in order to facilitate the input of a variety of items at a time as a bid, information can be stored in a data file and retrieved based on a first input item of ID. The information is then retrieved from the data file, so that an input screen may only require a single input number, while the corporation may be provided with an input screen whereby a variety of types and a plurality of items can be easily entered into the data file.

Additionally, for example, the quantity of a product may be increased so as to continue the bidding for the additional product which was not covered by a previous transaction. Thereby, the seller gains the benefit of selling a greater quantity of product by adding to the initial bid information. Such increases can be treated as one bid or, if desired, as independent bids each for a specified quantity of articles to be registered as a group input, so that when a transaction is concluded for that registered group, the transaction for the concluded number of articles can be closed.

Also, both parties (seller and purchaser) are provided a transaction conclusion notice at the completion of the bidding and, at the same time, the mediator collects a commission of a predetermined percentage of the transaction price from the seller. Thus, until a transaction is concluded, the commission is not paid and the opportunity exists for participation of a larger number of bidders, thus promoting better transaction conditions.

Additionally, there may be another commission collecting method whereby the mediator collects membership fees from purchasers and sellers. There may be such a membership collecting method that collects membership fees at the time of registering, every month, half a year, etc. or for each bid or plurality of bids. In this way, it is possible to deter false bidding and cancellation of a bid after a transaction is concluded.

A sales system on a communication network of the invention permits a mediator in the communication network to receive an initial bid from a purchaser for a commodity at a desired purchase price while receiving an initial bid from a seller for a commodity at a desired sales price and post or present the results of their bids to both parties when the bidding conditions of the above-mentioned seller and those of the above-mentioned purchaser are the same in terms of conditions.

By this system, if a commodity is a new computer, for example, it can be bid with its manufacturer's guarantee as a condition and without a guarantee by the seller. The purchaser often asks for only the purchase price as his selecting condition. Therefore, by creating a condition where all of the purchasers bid under this unified condition of a total cost of a delivery fee, a consumption tax, etc., a delivery time limit, and other conditions, a larger number of bidders can participate in the auction, which generally permits the seller to sell to more purchasers and sell them a plurality of commodities, thereby creating higher profits than in a case where he would sell one commodity. The purchasers, not only have the opportunity of a less expensive purchase, but also can make a higher bid for a scarce commodity, thus permitting the seller to gain higher profits.

Additionally, a bidder who so desired could have their credit or celebrity included in the information provided to sellers when listed among a number of other bidders. Purchasers can take into account other factors including a sales store's credit offer, guarantee, and location when bidding for a commodity or service that they do not consider to be of the same value even at the same sales price, thereby collecting more sellers and purchasers, thus enhancing the price competition.

If operational credit, guarantee, and location of a sales store is added to the information, even the same quality commodity or service may be considered to have different value by purchasers when their desires for other conditions differ. Therefore, if desired sales stores are different, even the same commodity may be said to be sold as a seller inherent commodity, so that, even if the total costs including a delivery fee and consumption tax and a delivery time limit or the like are unified for all of the sellers, the relevant product cannot be considered to be the same commodity when the sellers desire differently, so that a price competition does not occur among the sellers. If, in particular, there is a plurality of sales bids for only one purchase bid or there is a plurality of purchase bids for only one sales bid, no competition occurs, so that only one purchase or sales bid occupies the auction, thus making it difficult to establish a fair transaction price.

Another embodiment of the invention features the sales system in which a plurality of purchase or sales bids are registered in a group beforehand so that when a transaction is concluded the remaining bids are cancelled. Therefore, if the commodity is a stock or any other security the rise or fall of the value of the commodity will not be affected by unresolved bids.

By the communication sales system concerning securities dealing in the communication network in this embodiment, a mediator in the communication network receives a bid from a purchaser for a desired commodity at a desired purchase price and receives a bid from a seller for a desired commodity at a desired sales price at the same time and posts or presents the bidding results to both parties so that when a plurality of purchase orders or sales orders are registered and correlated to the purchaser or seller respectively, and when a number of the bids are concluded in transaction, the balance of the registered orders are cancelled.

Typically, if one country encounters a sudden rise or fall in its stock market, that change may often pervade the world stock markets and cause a turmoil in the world economy in ever increasing scales given the increasing linkage of various countries' stock markets created by advanced communication technologies. Specifically, once a sudden rise or fall develops in securities dealing, a balance is destroyed between the number of purchase orders and sales orders, such that no transactions are concluded causing the anxious order placers to panic, thus further worsening the sudden rise or fall.

To account for this situation, if, for example, a purchaser who would like to purchase stocks of only one company has registered an order for a number of shares of stock for a given price of company A currently selling at a higher price and an order for a number of shares of stock for a given price of company B currently selling at a higher price, and the value of one of these stocks is lowered by a sudden fall, that transaction is concluded first and the transaction results are presented to other order placers to thereby sooth them in order to increase the number of the purchase orders of the company which is one-sidedly lowered in price by the conventional stock transaction system, thus supporting the market as a whole.

Also, generally, in contrast to a purchase order which can be placed more than one at a time, when an actual stock certificate is sold in a transaction other than a conventional short sales, a sales order can be placed only for 1000 stocks for each 1000 stock certificates, so that the purchase orders become numerous relative to the sales orders, thus tending to support the price even with concentrated sales orders on one company. Further, such a system that enables transmission of canceling instructions to a bond market, commodity market, futures market, or new speculative market causes the funds to be biased to the falling markets, thus preventing them from further falling.

BRIEF DESCRIPTION OF THE DRAWINGS

FIG. 4 is a display screen for group registration;

FIG. 5 is another display screen for group registration;

FIG. 6 is further another display screen for group registration;

FIG. 7 is a display screen for showing a state where a transaction is concluded partially or in a small number of articles in group registration;

FIG. 8 is a display screen where another screen for transaction conclusion for group registration is formed;

FIG. 9 is a display screen showing a planar layout etc. of concert hall seats;

FIG. 11 is a display screen of a list for group registration of responses to bids for concert hall seats;

FIG. 12 is a display screen showing a list of bids on the providing side of lodging facilities such as a hotel;

FIG. 13 is a display screen showing group registration of sales bids for a lodging facility;

FIG. 14 is a display screen showing a list of bidding states of airplane tickets.

DETAILED DESCRIPTION OF THE INVENTION

The following will describe embodiments of the invention with reference to the drawings. A mediator I having a server in a communication network such as the Internet creates a bulletin board for presenting sales information about a variety of commodities, and provides the bulletin board over the Internet to purchasers and sellers.

Next, a number of purchasers A, B, and C and a number of sellers X, Y, and Z register their membership beforehand with the mediator I via a personal computer etc. connected to the Internet, and thereafter respond from time to time with a bid including their desired purchase and sales prices and the number of articles to be dealt with for a desired commodity.

Figure 1:
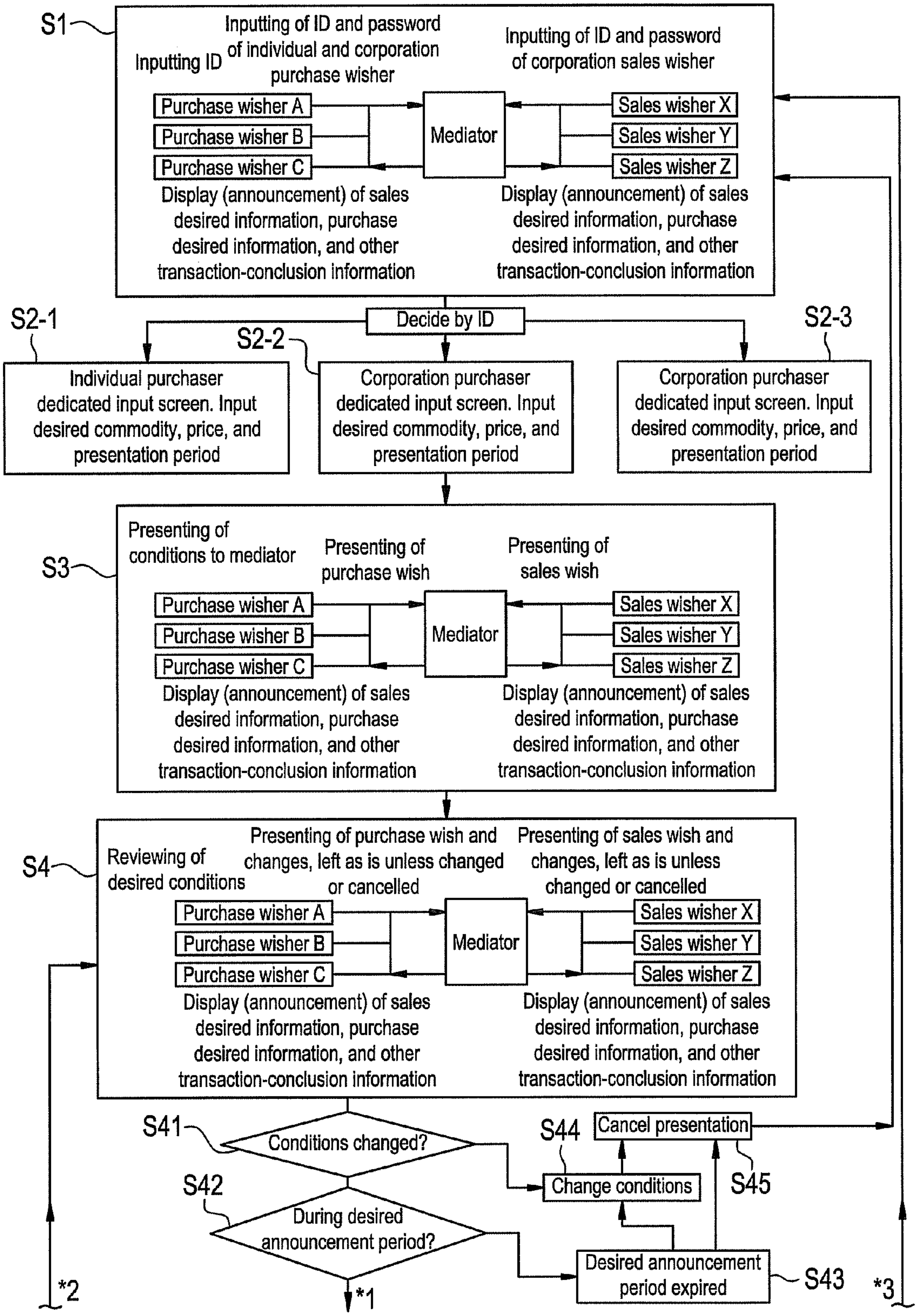
FIG. 1 is an illustration for explaining a former half of a sales system in a communication network related to an embodiment of the invention.
Figure 2:
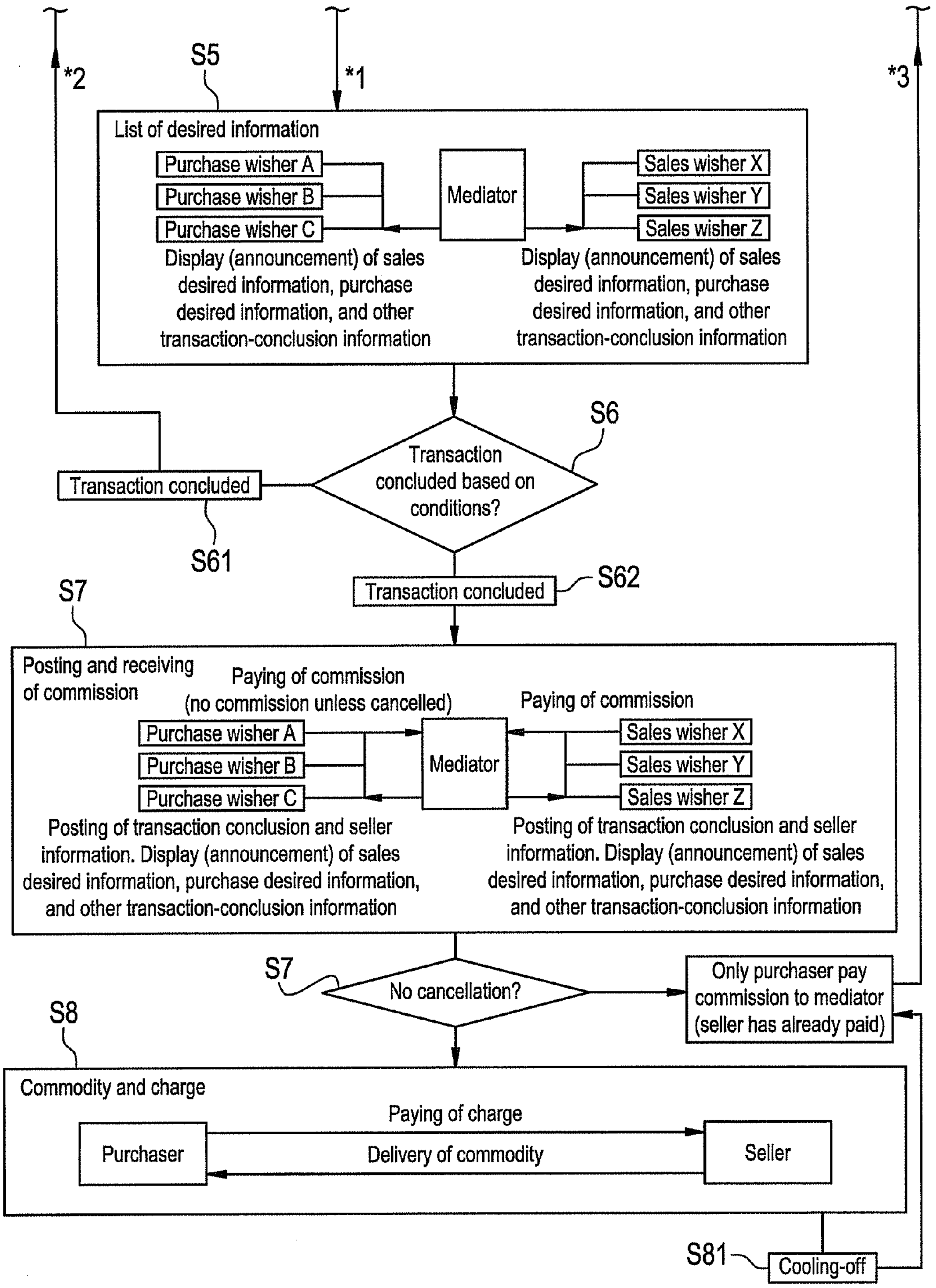
FIG. 2 is an illustration for explaining a latter half of the sales system in the communication network related to the invention.

FIG. 1 shows a former half of a procedure for implementing the sale system and FIG. 2, a latter half of it. When a purchasing or selling bidder who has registered his membership and has input his ID (step S1), it is collated with the member data to display an input screen for commodity information for either an individual or a corporation (steps, S2-1, S2-2, and S2-3) . The individual member typically inputs fewer types of commodities in smaller quantities, whereas the corporation member typically inputs a large number of commodity types and articles, so that they cannot efficiently be dealt with in the form of an individual. Therefore, in order to input a large number of commodity types and a large quantity of articles on one screen, the invention provides a number of commodity columns and is capable of inputting the number of articles in three to four digits.

If the member database has therein the bidding conditions which have already been input in the registered ID but not concluded in transaction, its list is displayed to select modification or new entry of the contents thereof. If the new entry option is selected, each column on the input screen has a blank output in it and if the modification option is selected, selected one bidding condition is output to each column as the initial state, which is appropriately modified to thereby simplify the inputting jobs.

The bidding condition thus newly input or modified is presented to the mediator I via the Internet (step S3) to be saved on the server and, at the same time, confirmed on the input screen again (step S4). Then, it is decided whether a desired announcement period is expired (step S42) and whether it is modified (step S41), so that any bid beyond the desired announcement period (step S43) or any bid modified (step S44) is cancelled (step S45).

The mediator I roughly divides the bid-responding conditions into commodity-related, purchase-related, and sales-related conditions and gives them priorities in an descending order to the purchase desired conditions, in an ascending order to the sales desired conditions, and a time-lapsing order of the bid-responding time for the same amounts so as to provide a transaction conclusion order and then present via the Internet a list thereof to the users other than the mediator I (step S5).

TABLE 1

| Windows PC/Notebook price list | | | | | | | | | |
|---|---|---|---|---|---|---|---|---|---|
| Commodity No. | | Maker Product No. | Current Price | Difference from previous day | Transaction quantity | Purchase desired price | Quantity | Sales desired price | Quantity |
| s-1 | any | vio/400 | ¥190,000 | ¥-1,000 | 35 | ¥190,000 | 20 | ¥191,000 | 18 |
| s-2 | any | vio/300 | ¥250,000 | ¥0 | 27 | ¥250,000 | 17 | ¥251,000 | 30 |
| s-3 | any | vio/350 | ¥270,000 | ¥1,000 | 33 | ¥270,000 | 19 | ¥271,000 | 17 |

To read an individual detailed bidding state in the list of all the purchase and sales desired conditions, its commodity number can be specified.

TABLE 2

| Windows PC/Notebook price list | | | | | |
|---|---|---|---|---|---|
| Commodity No | | | s-1 | | |
| Product No | High Price | Low price | Current Price | Transaction quantity | Difference from previous day |
| vio/450 | ¥271,000 | ¥270,000 | ¥270,000 | 33 | ¥1,000 |

| Purchase desired price | Quantity | Sales desired price | Quantity |
|---|---|---|---|
| ¥270,000 | 19 | ¥271,000 | 17 |
| ¥269,000 | 15 | ¥272,000 | 20 |
| ¥268,000 | 20 | ¥273,000 | 25 |

The bidding conditions for incorporeal articles such as real estate dealing or staffing of personnel or occupation are listed below.

TABLE 3

| | | |
|---|---|---|
| Photo<br>Address<br>Wideness<br>Location conditions | Sales desired price | ¥30,000,000 |
| | Previously negotiated price | ¥30,000,000 |
| | Purchase desired price | ¥29,000,000 |
| | Purchase desired price | ¥28,500,000 |

The conditions listed above are for sales bids of real estate transactions. The left column has a photo etc. to facilitate the understanding of the location conditions such as a size etc. of the real estate. Another display scheme displays a landscape through the window, a video image, a list of room numbers, and an interior of each room for easy comparison of their differences. The price of the rooms is different according to differences in the through-the-widow view at various view levels in the room like in the case of lodging fees or utilization fees of lodgings, so that if an article to be sold is a lodging fee, for example, the through-the-window view can be displayed when the details are desired.

In the right column of the above table, sales desired prices are given in the top row. The previously negotiated price in the second row indicates a transaction negotiated price unconcluded which is presented by the seller and is used as a standard. The lower two rows indicate the highest two prices of purchaser bids.

TABLE 4

| | | |
|---|---|---|
| Photo<br>Age<br>Personal history<br>Comment, etc. | Desired annual Salary | ¥30,000,000 |
| | Previously negotiated price | ¥30,000,000 |
| | Employer's desired amount | ¥29,000,000 |
| | Employer's desired amount | ¥28,500,000 |

Table4 presents a person registered for personnel staffing. The left column has a face photo etc. and an age, personal history, and comment of the relevant person. The right column has his desired annual salary in the top row. The previously negotiated price in the second row indicates a negotiated annual salary unconcluded which is presented by the seller and is used as a standard. The lower two rows indicate the highest two prices bid by a would-be employers. These are likely to be utilized by those with special skills.

TABLE 5

| | Annual Salary | |
|---|---|---|
| Corporate introduction<br>Corporate Conditions<br>Comment, etc. | Employer's desired amount | ¥30,000,000 |
| | Previously negotiated amount | ¥30,000,000 |
| | Desired amount | ¥31,000,000 |
| | Desired amount | ¥31,500,000 |

Table 5 lists those registered for occupation staffing. The left column indicates the corporate introduction and employment conditions and the personnel department comment etc. The right column indicates the employment annual salary in the top row. The previously negotiated price in the second row indicates a negotiated annual salary unconcluded which is presented by the seller and is used as a standard. The lower two rows indicate the highest two employment wisher's desired bid amounts. Those items are utilized not only by the society members but also by students, housewives, etc.

Thus, the transaction covers a wide range of items, which are bid for, so that when sales and purchase conditions for the same commodity are bid later for purchase and sales conditions forbids made earlier, a decision is made whether or not to conclude the transaction (step S6). If the transaction is not concluded (step S61), control returns to the confirmation screen step to change or cancel the sales and purchase bids with the exception of the initial bids (step S4). In this case, it is also possible to keep the bidding conditions unchanged, to thereby make a new bid in response to these remaining bids. If, the transaction is concluded, on the other hand, (step S62), the mediator I notifies both parties who have acquired the right of transaction (winning bids) and their respective contacting destinations and, at the same time, collects as the commission a predetermined percentage of a transaction price from a seller who has acquired the selling right (made the winning bid) (step S7). The commission can be collected simply by transferring from the credit card account which is contacted at the time of registration. If the transaction is cancelled as a result of notification (step S71), the registration of the person who has cancelled is absolved to make feedback to that effect to the ID inputting step in order to disable bid responding by use of that ID (step S72).

Afterward, without intervention of the mediator, both parties who have acquired the transaction right communicate with each other in checking the methods for paying charges and delivering commodities and then pay the charges and deliver the commodities (step S8). Since actual transactions can mutually be checked by the parties concerned, it is possible to prevent such troubles as unpaid charges, undelivered commodities, etc. Also, in the case of personnel or occupation staffing, even if a bid is concluded in transaction, unlike commodities, the personnel cannot correctly be examined until actual interview in various respects, so that such a procedure is employed that both parties who have acquired the transaction right communicate with each other in interview and then confirm the method of paying salaries, i.e. charges of job provision and the working conditions.

In the above, although the credit card transfer method is exemplified as the commission collecting method, other paying methods such as bank pay-in may be employed. Also, a cooling-off method is employed, whereby within a certain period from the time of commodity delivery, the purchaser can return the commodity (step S81).

The following will describe the decision conditions for transaction conclusion at the above-mentioned decision step S6. Bids provided with a priority order at the listing step S5 directly provide transaction-concluded prices if the conditional amounts are equal to each other, so that the transaction is concluded for a smaller number of articles to be dealt with, leaving the bids for the remaining number of articles with the amount conditions left as they are. In this case, the conditions can be changed and the bids can be cancelled by the bidder arbitrarily as they desire if the transaction is not yet concluded, to newly announce thus changed bidding conditions in the bidding list, waiting for a next bid response.

Next, in the case where the amounts are not equal, if the later presented purchase bid is higher than the earlier presented sales bid, the sales bid provides a transaction-concluded price. Otherwise, the transaction is not concluded.

Similarly, if the later presented sales bid is lower than the earlier presented purchase bid, the purchase bid provides the transaction-concluded price. Otherwise, the transaction is not concluded.

Next, decision is made under conditions which may be concluded if a certain time lapse is given, and is made based on comparison to the previously concluded transaction price if both parties bid simultaneously.

The following will describe a case, for example, where the sales bid is ¥901 and the purchase bid is ¥1000. First, the previously concluded transaction prices are supposed to have been ¥800, ¥920, and ¥1100 as given below.

(Price list 6)

| Sales Desired Price | Previously Concluded Transaction Price | Purchase Desired Price |
|---|---|---|
| ¥901 | ¥1100<br>↓<br>[¥1000]<br>[¥920]<br>[¥901]<br>↑<br>¥800 | ¥1000 |

If the previously concluded transaction price is ¥920, which is higher than the sales bid and lower than the purchase bid, the previous price provides a transaction-concluded price of ¥920. Next, if the previously concluded transaction price is ¥800, which is lower than the sales bid, the sales bid provides the transaction-concluded price of ¥901. If the previously concluded transaction price is higher than the purchase bid, the purchase bid provides the transaction-concluded price of ¥1000.

Finally, if there is no previously concluded transaction price available, an intermediate price of the sales bid of ¥901 and the purchase bid of ¥1000 is provided and, if the intermediate price, e.g. ¥950.5, has a fraction, a difference amount of ¥99 is halved and its fraction is truncated to be added to the sales bid to provide a transaction-concluded price of ¥950.

Also, if, for one sales bid, there are two higher purchase bids H and L in bidding simultaneously, the sales bid and only the purchase bid H are selected for transaction conclusion to determine a transaction-concluded price as follows.

For example, it is supposed that the sales bid is ¥1000 and the purchase bids are L: ¥1100 and H: ¥1400. If there is no previously concluded transaction price available, the lower purchase bid of L: ¥1100 provides a transaction-concluded price. The following will describe a case where the previously concluded transaction price are ¥600, ¥1200, and ¥1500.

(Price list 7)

| Sales Desired Price | Previously Concluded Transaction Price | Purchase Desired Price |
|---|---|---|
| ¥1000 | ¥1500<br>↓<br>[¥1400]<br>[¥1200]<br>[¥1100]<br>↑<br>¥600 | ◎H: ¥1400<br>L: ¥1100 |

If the previously concluded transaction price is higher than the purchase bid L and lower than the purchase bid H, the transaction-concluded price is equal to the previously concluded transaction price, i.e. ¥1200. Next, if the previously concluded transaction price is higher than the purchase bid H, the purchase bid H provides the transaction-concluded price of ¥1400. If the previously concluded transaction price is lower than the purchase bid L, the purchase bid L provides the transaction-concluded price of ¥1100.

If, opposite to the previous case, sales and purchase are reversed in occurrence order and two sales bids H and L are made simultaneously for one purchase bid, the purchase bid and only the lowest sales bid L are concluded in transaction to determine a transaction-concluded price as follows.

It is, for example, supposed that the purchase bid is ¥1000 and the sales bid are L: ¥500 and H: ¥900. If there is no previously concluded transaction price available, the higher sales bid H: ¥900 is selected as the transaction-concluded price. The following will describe a case where the previously concluded transaction prices is ¥400, ¥600, and ¥1100.

(Price list 8)

| Sales Desired Price | Previously Concluded Transaction Price | Purchase Desired Price |
|---|---|---|
| H: ¥900 | ¥1100 | ¥1000 |
| ◎L: ¥500 | ↓ | |
| | [¥900] | |
| | [¥600] | |
| | [¥500] | |
| | ↑ | |
| | ¥400 | |

If the previously concluded transaction price is higher than the sales bid L and lower than the purchase bid H, the transaction-concluded price is equal to the previously concluded transaction price of ¥600. Next, if the previously concluded transaction price of ¥400 is lower than the sales bid L, the sales bid L provides the transaction-concluded price of ¥500. If the previously concluded transaction price of ¥1100 is higher than the sales bid H, the sales bid H provides the transaction-concluded price of ¥900.

If, further, a plurality of bids are made in both sales and purchase simultaneously and a plurality of purchase bids H and L are bid for a plurality of sales bids H and L, only the lowest sales bid and the highest purchase bid are concluded in transaction to determine a transaction-concluded price as follows.

(Price list 9)

| Sales desired price | Purchase desired price |
|---|---|
| ¥900 1 pc. | ◎¥800 5 pcs. |
| ¥800 1 pc. | ¥700 3 pcs. |
| ¥700 2 pcs. | ¥600 4 pcs. |
| ◎¥600 4 pcs. | ¥500 2 pcs. |

A difference of the number of articles for the lowest sales bid of ¥600, which is four, and the number of articles for the highest purchase bid of ¥800 is one for the purchase bid of ¥800. The criteria for selecting bids from among the five articles of the purchase conditions is based on the principle of a time-lapsing order of bidding.

(Price list 10)

| Sales desired price | Purchase desired price |
|---|---|
| ¥900 1 pc. | (¥800 5 pcs.) |
| ¥800 1 pc. | Δ¥800 1 pc. |

-continued (Price list 10)

| Sales desired price | Purchase desired price |
|---|---|
| ¥700 2 pcs. | ¥700 3 pcs. |
| (¥600 4 pcs.) | ¥600 4 pcs. |
| | ¥500 2 pcs. |

If the desired price of the remaining number of articles is a purchase bid, the difference of the number of articles of the next lowest sales bid of ¥700 for the purchase bid of ¥800 is one article of the sale bid of ¥700.

(Price list 11)

| Sales desired price | Purchase desired price |
|---|---|
| ¥900 1 pc. | (¥800 5 pcs.) |
| ¥800 1 pc. | ¥700 3 pcs. |
| ¥700 1 pc. Δ | ¥600 4 pcs. |
| (¥700 1 pc.) | ¥500 2 pcs. |
| (¥600 4 pcs.) | |

If the desired price of the remaining number of articles is a sales bid, the difference of the next higher purchase bid of ¥700 for the sales bid of ¥700 is two articles of the purchase bid of ¥700.

(Price list 12)

| Sales desired price | Purchase desired price |
|---|---|
| ¥900 1 pc. | (¥800 5 pcs.) |
| ¥800 1 pc. | (¥700 1 pc.) |
| (¥700 2 pcs.) | Δ¥700 2 pcs. |
| (¥600 4 pcs.) | ¥600 4 pcs. |
| | ¥500 2 pcs. |

Such a transaction conclusion process is repeated until there is no purchase bid available higher than the sales bid.

As a result, first if the sales bid is equal to the purchase bid, that price is determined to be a transaction-concluded price. Thus, six sales bids and six purchase bids are used in transaction conclusion processing until the transaction conclusion makes up a uniform transaction-concluded price of ¥700.

Second, when in the case of no equal bids in contrast to the first case, i.e. both of the remaining highest purchase bid and the lowest sales bid are between the last difference-processed sales bid and purchase bid, a transaction-concluded price is determined by a decision method taking into account the previously concluded transaction price.

For example, as in the following case, a transaction is concluded for two articles and there has been no purchase bid higher than the sales bid, and, as a result, the remaining highest purchase bid of ¥800 and the lowest sales bid of ¥700 are between the last difference-processed sales bid of ¥900 and purchase bid of ¥600.

(Price list 13)

| Sales Desired Price | Previously Concluded Transaction Price | Purchase Desired Price |
|---|---|---|
| ¥800 1 pc. | | (¥1000 1 pc.) |
| (¥600 1 pc.) | ¥900 | (¥900 1 pc.) |
| (¥500 1 pc.) | ↓ | ¥700 1 pc. |
| | [¥800] | |
| | [¥740] | |
| | [¥700] | |
| | ↑ | |
| | ¥600 | |

First, if there was a previously concluded transaction price and if its amount of ¥740 is higher than the remaining purchase bid of ¥700 and lower than the remaining sales bid of ¥800, the transaction-concluded price is ¥740 which is equal to the previously concluded transaction price. Next, if the previously concluded transaction price of ¥600 is lower than the remaining purchase bid of ¥700, that purchase bid provides the transaction-concluded price of ¥700. If the previously concluded transaction price of ¥900 is higher than the remaining sales bid of ¥800, the remaining sales bid provides the transaction-concluded price of ¥800. Finally, if there is no previously concluded transaction price available, an intermediate price of ¥750 between the sales bid of ¥800 and the purchase bid of ¥700 is set as the transaction-concluded price, so that if the intermediate price has a fraction, the fraction of a half of the difference is truncated to add the half price to the sales bid to provide the transaction-concluded price. The thus determined price provides a parenthesized transaction-concluded price for two articles of concluded transactions.

By the third decision method, when there are no equal bids in contrast of the first decision case and at least one of the remaining highest purchase bid and the lowest sales bid is not between the last difference-processed sales bid and purchase bid, the transaction-concluded price is determined by the decision method taking into account the previously concluded transaction price for the already described simultaneous bidding.

For example, in the case where there are two concluded transactions and there has been no purchase bid higher than the sales bid, at least one, both in the following case, of the remaining highest purchase bid of ¥1000 and the lowest sales bid of ¥500 is not between the last difference-processed sales bid of ¥900 and purchase bid of ¥600.

(Price list 14)

| Sales Desired Price | Previously Concluded Transaction Price | Purchase Desired Price |
|---|---|---|
| ¥1000 1 pc. | ¥1000 1 *pc.* | (¥1000 1 pc.) |
| (¥600 1 pc.) | ↓ | (¥900 1 pc.) |
| (¥500 1 pc.) | [¥900] | ¥500 1 pc. |
| | [¥740] | |
| | [¥600] | |
| | ↑ | |
| | ¥500 | |

First, there was a previously concluded transaction price and if its amount of ¥740 is lower than the last transaction-concluded purchase bid of ¥900 and higher than sales bid of ¥600, the transaction-concluded price is equal to the previously concluded transaction price of ¥740. Next, if the previously concluded price of ¥500 is lower than the last transaction-concluded sales bid of ¥600, that sales bid provides the transaction-concluded price of ¥600. With this, the previously concluded transaction price of ¥1000 becomes the transaction-concluded price of ¥900. Finally, if there is no previously concluded transaction price available, an intermediate price of ¥750 between the last transaction-concluded sales bid of ¥600 and purchase bid of ¥900 is set as the transaction-concluded price, so that if it has a fraction, the fraction of a half of the difference is truncated to add the half to the sales bid in order to provide the transaction-concluded price. The thus determined price provides parenthesized the transaction-concluded price for two concluded transactions.

If a bid and a transmission time are the same for a plurality of sales conditions or price, the mediator I can decide to give priority to either of them. Also, for example, in order to activate the system for initiating a transaction, all the bidding conditions received from the time of bid starting to the time of transaction starting are taken to have been presented, so that in a case of a plurality of sales bids and one purchase bid or a case of a plurality of purchasers and one seller, the transaction is concluded according to the above-mentioned decision conditions.

Figure 3:
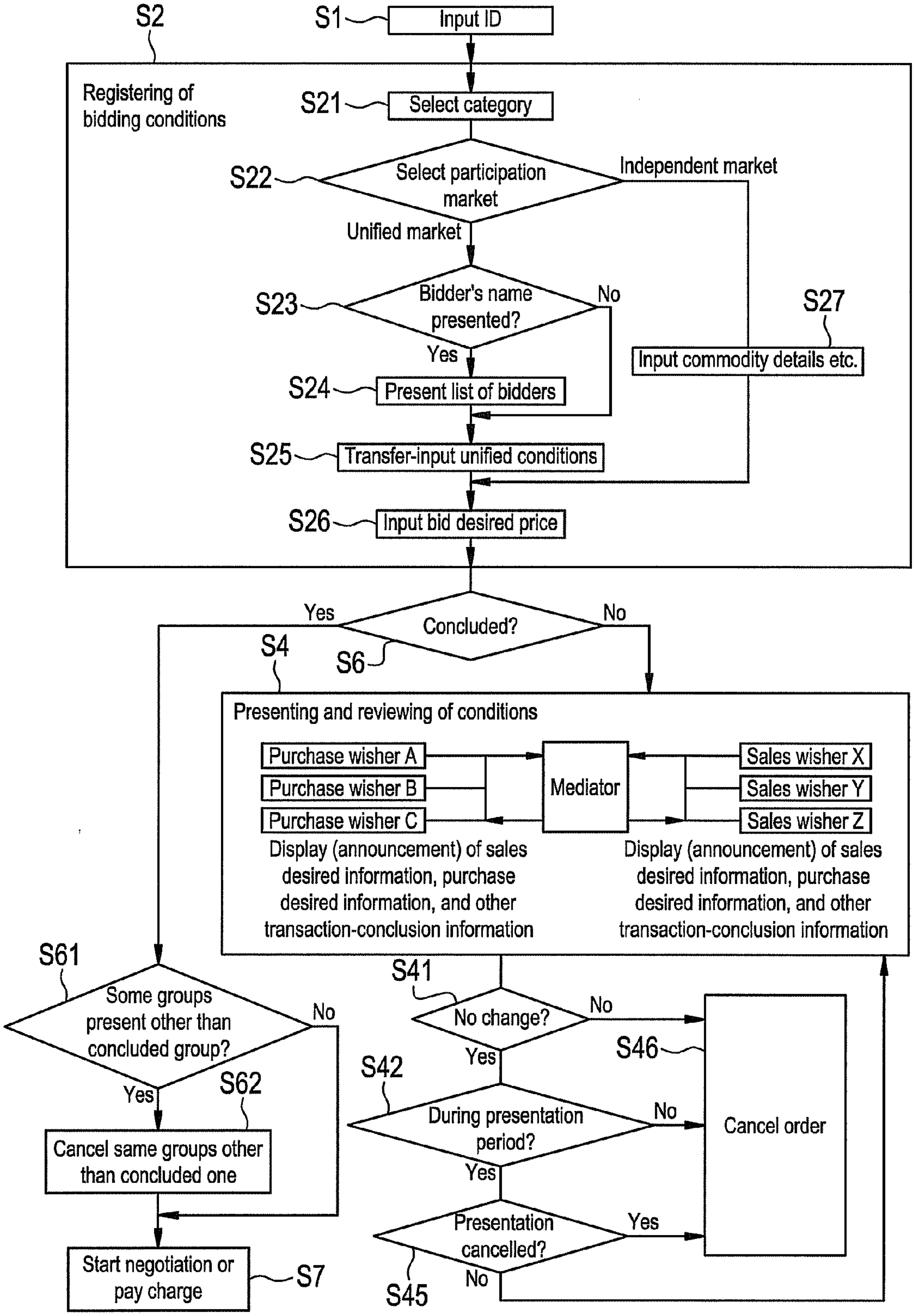
FIG. 3 is an illustration for explaining another embodiment of the invention.

The following will describe another embodiment with reference to FIG. 3.

FIG. 1 shows detailed inputs of bidding transactions for a commodity, so that the more detailed the commodity explanation, the more unlikely the price competition is to occur because the same market has been formed by other bids.

To account for this, as shown in FIG. 3, the commodity conditions can be unified to some extent to increase individual bids in order to cause an appropriate price competition. First, an ID is input and confirmed (step S1) and a bidding category is selected (step S21). An independent market or a unified market is selected from a list of participating markets (step S22). Next, the names of bidders are listed and the invention permits them to select whether they wish to be presented in an unspecified situation (step S23). By this method of listing the bidders' names to present them in an unspecified situation, as indicated in Table 6, a plurality of sales stores' names are listed in the top row, so that there are provided a sales bid by participating two or more stores to give a benefit to some extent.

TABLE 6

| | |
|---|---|
| List of sales participants | stores A, B, C, D, E, F, G, H, I |
| Address | Aichi Pref. |
| Contact destination | 03-************ |
| Commodity delivery | Commodities are delivered within fours days after charge transfer is confirmed (transfer to sales store) |
| Pay (bank transfer) | Paid charge = purchase desired price + consumption tax + delivery fee + transfer commission |
| Paying (cash on delivery) | Paid charge = purchase desired price + consumption tax + delivery fee + cash-on-delivery commission |
| Cancellation | Commodities can be returned to sales stores within eight days (not beyond this) after they are delivered. No cancellation possible after they are unpacked. Cancelled if no transfer is made within five days from notification of transaction conclusion or if no contacting is made within five days after notification of transaction conclusion. |

TABLE 6-continued

| | |
|---|---|
| Delivery fee upon cancellation etc. Guarantee | Delivery fee to be paid by purchaser In accordance to maker guarantees. For details, contact a sales stores, which will notify you of transaction conclusion. |

If the bidder's name is not to be displayed at step S23, the same registration pattern as that in FIG. 1 is provided, so that the desired conditions are registered such as details of commodity contents and presentation desired period (step S25) and an initial bid is registered last (step S26).

The unified commodity conditions may include the second row and subsequent in Table 6 such as delivery date, paying method, cancellation period, delivery fee to be paid, guarantees, and such contents in Table 7 below as mediator's commission amount and delivery fee amount.

TABLE 8

| Registration of bidding conditions | | | | |
|---|---|---|---|---|
| ID No. | 99999 | Name | YAMADA Tarou | |
| Commodity No. | Maker Name | Product Name | Product details | Purchase desired price |
| s-1 | ony | vio/400 | | ¥190,000 |
| s-2 | ony | vio/300 | | ¥250,000 |
| s-3 | ony | vio/450 | | ¥270,000 |

There has been provided three rows of input columns, to input desired conditions in these columns according to a desired number of inputs of one through three. For example, if one desires to purchase a commodity, he inputs its maker, commodity type, color, and performance in details and his

TABLE 7

| Mediator's commission | | | | | | | |
|---|---|---|---|---|---|---|---|
| Paid amount | Less than ¥30,000 | ¥30,000-less than ¥100,000 | ¥100,000-less than ¥200,000 | ¥200,000-less than ¥300,000 | ¥300,000-less than ¥400,000 | ¥400,000-less than ¥500,000 | ¥500,000 and higher amounts to be transferred to bank |
| Commission | ¥400 | ¥700 | ¥1,200 | ¥2,200 | ¥3,200 | ¥4,200 | — |

| Area-specific delivery fee | | | | | |
|---|---|---|---|---|---|
| Area | Honsyu | Shikoku | Kyusyu | Hokkaido | Okinawa |
| A | ¥800 | ¥1,100 | ¥1,200 | ¥1,200 | ¥1,300 |
| B | ¥1,200 | ¥1,500 | ¥1,800 | ¥1,800 | ¥2,500 |
| C | ¥1,800 | ¥2,000 | ¥2,200 | ¥2,200 | ¥4,000 |

If an individual market is selected at the step of participating market selection (step S22), the input screen shown in FIG. 1 is displayed that is capable of inputting all the desired conditions of the bidder (step S27), so that only the initial bid remains to be input (step S26) to complete the registration of the bidding desired conditions. In this case, on the selection screen for individual conditions, the input screen can be activated for those who want to set individual conditions not yet on the list.

The bidding conditions registered respectively in those unified and individual markets are indiscriminately subject to comparison and decision for transaction conclusion (step S6), so that in the case of an unconcluded transaction, like at step S4 in FIG. 1, the bidding conditions can be reviewed (step S4), so that as a result, the bidding conditions can be changed or cancelled arbitrarily (steps S41 and subsequent). Although FIG. 1 shows a flow that the reviewing step S4 is set immediately before the sales concluding step 6 to make feedback to step S4 in the case of unconcluded transaction, the reviewing step S4 may be set immediately before the transaction concluding step 6 in FIG. 3.

Next, such a scheme is employed that at the conditions inputting step (S25) and the initial bid inputting step (S26) shown in FIG. 3, one person or corporation as shown in Table 8 can input a plurality of conditions at a time and select only one of those transactions concluded quickly and cancel the others.

desired purchase price finally. As for prices, different commodities or services of various makers correspond to different amounts which are valid for bidders.

The bidding conditions registered in groups are given symbols to indicate them, for example symbol S is given as the commodity number. If one of those bids is concluded at the transaction conclusion step S6 in FIG. 3, retrieval is made for any inputs other than the concluded desired condition that are registered in groups. In this case, retrieval is made for any conditions having the same symbol S as the commodity number. As for the retrieval method, if the number of conditions becomes larger, their group registration is given an index, formed in another file, to thereby retrieve that index, or specification information is added to one desired condition registered in a group such as a commodity number concerning other desired conditions contained in the group, so that when that one desired condition is concluded in transaction, that specification information is referenced for fast retrieval to retrieve the other desired conditions for cancellation.

If, on the other hand, a plurality of bids is selected from their list to register response bids, each of the listed bids is provided with a selection button, so that when it is pressed, the response bid is registered and, at the same time, the display screen of detailed bid contents for new bid responding and the input screen for inputting of the number of articles are presented for necessary inputting.

If those response bids are registered in groups, as shown in FIG. 4, an input column 20 is provided to select a group for group registration, so that when the downward arrow ▼ at the right end is pressed, a plurality of group registration destinations is indicated to select from. This is done in order to accommodate a case to change the conditions to make another group registration in order to respond to a plurality of bids.

Next, the input screen is shown in FIG. 5 wherein a response-bid price and a number of articles are input for bids registered in groups. A reference number 31 indicates a column to input a group registration type, reference numerals 32, 33, and 34 respectively indicate contents of three responding bids. These three are respectively provided with purchase bid indicating columns 32*a*, 33*a*, and 34*a* and quantity indicating columns 32*b*, 33*b*, and 34*b*.

Also, it is possible to, in place of the selection buttons for group registration shown in FIG. 4, simultaneously display a list screen for a plurality of bids and a display screen for group registration shown in FIG. 5 in one monitor screen to use a mouse or other inputting device to thereby select and register one of the listed bids. In this case, when one of the listed bids is selected by the mouse etc., it is temporarily saved in a cache memory when the mouse starts on the monitor with its hold button as input, so that when the hold button of the mouse is released on the display screen for group registration at a moving destination, the bid data temporarily saved is input in the group registration column of the moving destination of the mouse.

Although the number of articles to be dealt with has been one in FIG. 5, in a case of a free market for purchasing a mass-consumable such as dry cells, a transaction may be concluded for a large number of articles at a time and, further, as shown in FIG. 6, the quantity need not be input for each of them but a total quantity may be input in the total inputting column 35 for bid responding. The quantity columns 32*b*', 33*b*', and 34*b*' indicate the same quantities as the total inputting column 35 but their contents can be changed, in such a manner that a total of the quantity columns 32*b*', 33*b*', and 34*b*' may not different than the quantity in the total inputting column 35. If the quantities are different, then modifications are required such that the totals of 32*b*', 33*b*' and 34*b*' equals the quantity in column 35 to avoid cancellation after transaction conclusion.

There is also a case where each of the bidding destinations may conclude a transaction partially or for a small number of articles as shown in FIG. 7 or, as shown in FIG. 8, the transaction conclusion screen is separately formed to display columns 32*c*, 33*c*, and 34*c* which indicate the number of transaction-concluded articles.

With this, if there are any conditions registered in another group, those conditions are cancelled and then the transaction-concluded desired conditions are posted at step S7 shown in FIG. 2.

Although for convenience in explanation, a case where a transaction-concluded condition is selected from a total number of inputs in the input column to cancel the other conditions, the number of simultaneous inputs is not limited and the number of concluded transactions that can be decided is not limited to one, so that exclusion of the transaction-concluded condition is repeated as many times as the number of input conditions minus 1 to thereby cancel the transaction when the last input condition is left. For example, three rows of buttons in the next page can be added to the above-mentioned three rows of input screens to repeat inputting three at a time until the registration button is pressed. Also, to make two transactions or more in place of single transaction, a column can be added to input a numeral other than 1.

Also, bids which are added with a number of articles or quantity as a transaction condition may be treated as one bid or as independent bids for a certain number of article or quantity when it is input in its descriptive group registration, so that when a transaction is concluded for that group registration, the concluded number of articles of bids can be cancelled from the response bid waiting list to thereby display the number of articles in inventory again. This can be applied to the bidding system by conventional net mail.

The following will describe another embodiment showing individual bidding utilizing group registration.

Figure 10:
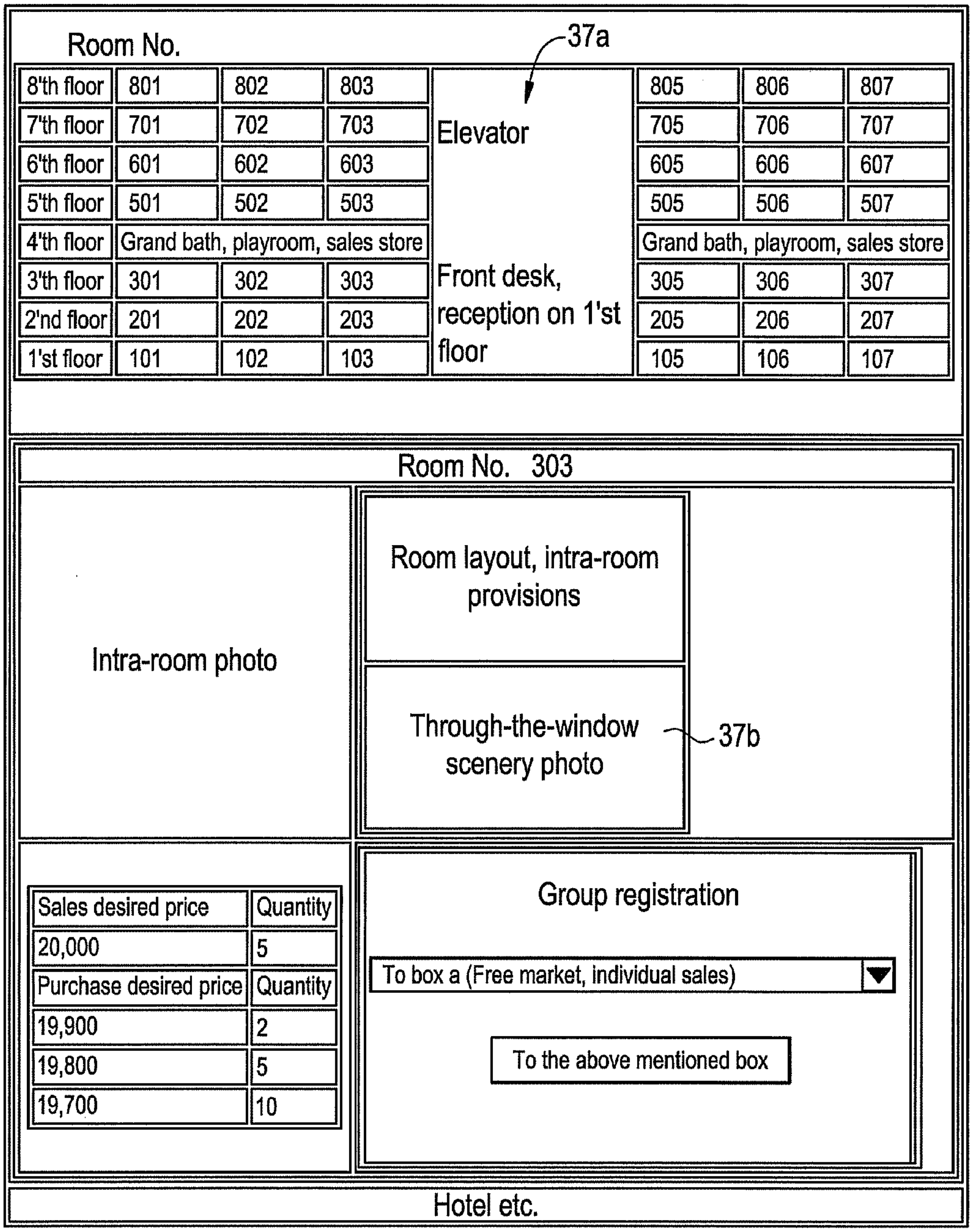
FIG. 10 is a display screen showing a room layout for each floor in a hotel.

If a sales subject bid in a communication network is a concert hall, a hotel room, or a subdivision house or an apartment room, all of the planar layout 36*a* of the hall seats shown in FIG. 9 and a room layout 37*a* for each floor of the building shown in FIG. 10 are preferably displayed, so that each input frame for the seat number or room number can be selected to display the details, i.e. various angled photos and computer graphics of, for example, a concert hall as viewed from each seat in the display frame 36*b* or through-the-window landscape photos of each room of, for example, a hotel according to a time zone or the layout and interior photos as well as front photos in the display frame 37*b* to check the state of lodging facilities.

Specifically, for the concert hall seats, the photos should be taken at a level of a photographer's height of approximately 175 cm and also at levels of A6 as well as other seats A1, A2, and A3. Also, the seat height, width, and back-and-forth-wise and lateral inter-seat distances should be displayed, and also, photos should be taken when a 175-cm tall person is seated and when adjacent persons are seated in, for example, A6 and A8 seats with a seat A7 therebetween and then given as information. Also, transportation means such as a train, airplane, ship, etc. need not have seat-specific information for ordinary seats but should have photos etc. of specified seats or first-class seats in a place.

Further, as for a date retrieved for displaying a list, in the case of concert hall seats, an auction etc. may be retrieved according to the selection items such as first show or second show on the day of the concert and, in a case of hotel lodging, airplane or train with unspecified utilization time, retrieval may be made by specifying only utilization date, for example, August 2nd or 3rd or, further, in a case of a train or airplane with a restricted utilization time to be followed, such items should be specified as, for example, Shirasagi 20th, from Nagoya to Kanazawa for departure at 10:00, service No., and a flight number of, for example, from Nagoya to Tokyo, Zenniku flight No. 752 for departure at 10:00.

FIG. 11 shows a list screen in which response bids for bids for concert hall seats are registered in groups, wherein bids are made for different three seats of 38*a*, 38*b*, and 38*c*.

Thus, for popular public performance or entertainment, a typical auction type may be utilized or, if expensive tickets may not be sold easily, they can be set at a relatively high price beforehand for sale. For public performance or entertainment not so popular, on the other hand, tickets may be left unsold but be discounted in price to thus prevent the concert hall from becoming sparse in many cases. Also, such a sales system may be utilized not only between general audience and a ticket seller but also between a ticket seller and a concert sponsor.

With this, such a sales system may be used in conjunction with, for example, a POS system, so that if a bid from among a group registration list of this invention is concluded in transaction, bringing a usual-sale commodity to the cash register to buy it may encounter a warning of "sold" by use of the POS system, which already has feedback of the sales results in the network, or the commodity may be pulled down from the shelf, to thereby use network sales along with over-the-counter sale, thus increasing the sale routes.

Also, FIG. 12 shows a list of bids made by the side providing lodging facilities such as hotels. A hotel may have various rooms accommodating different number of customers and different prices. For example, the rooms maybe displayed for two-persons rooms 39*a* and three-persons rooms 39*b* separately, so that they can be sold for ¥14,000 per head in group registration of the two-persons room 39*a* and for ¥21,000 in group registration of the three-persons room 39*b* as shown in FIG. 13.

Figure 15:
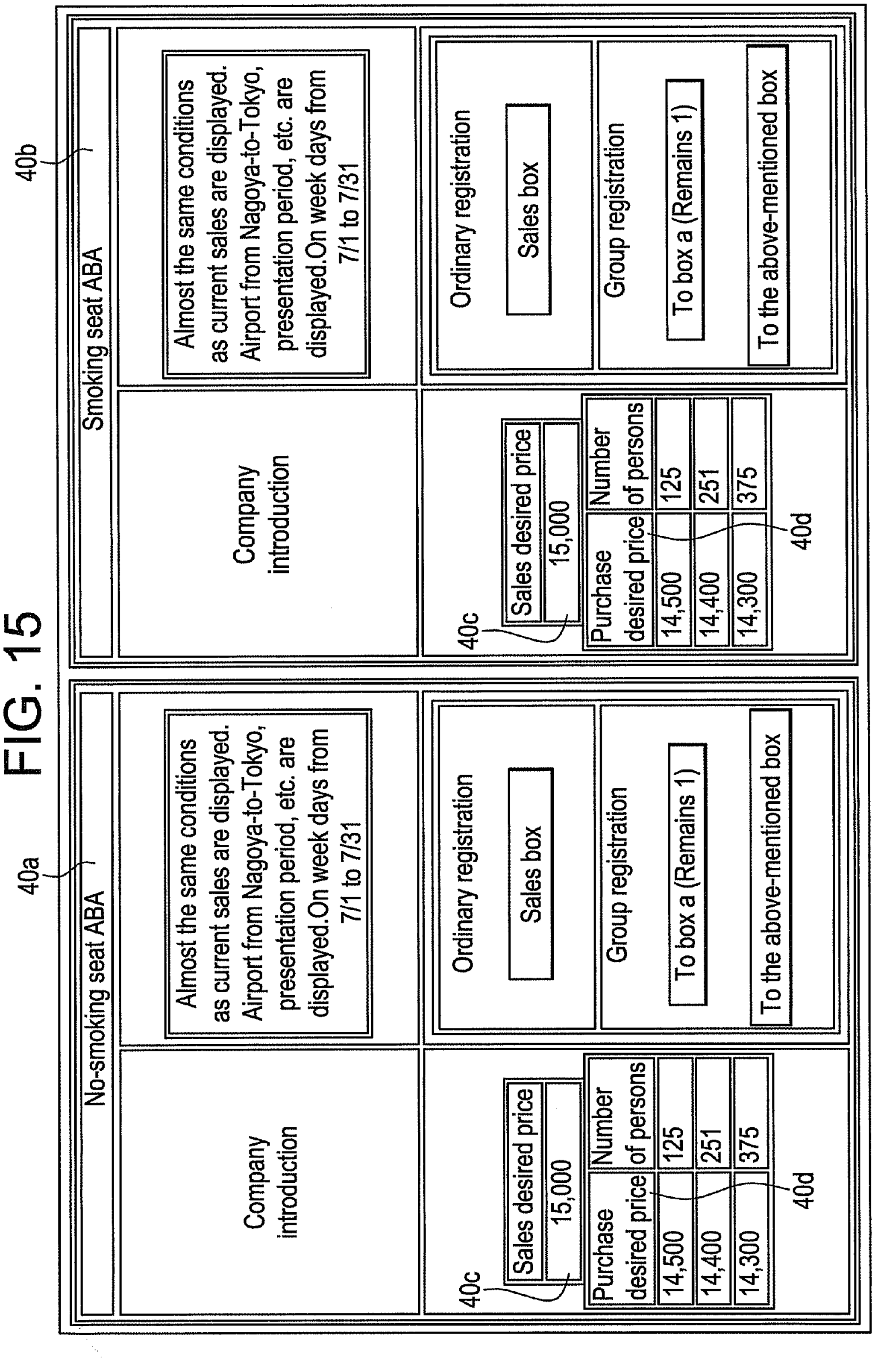
FIG. 15 is a display screen of group registration of sales bids for airplane tickets.

FIG. 14 shows a list of bidding states of airplane tickets as a transportation means. The list could otherwise include tickets for ships, and trains. The top columns indicate a transaction-concluded price, a number of sales articles, a price difference from the previous day as a reference and the lower left column indicates a purchase bid and also the lower right column indicates a selling bid. Also, as the unified condition of the free market, for example, a departure time is supposed to be 18:00 through 19:00 with a general seat from Nagoya to Tokyo. With this, as shown in FIG. 15, no-smoking seats 40*a* and smoking seats 40*b* are registered in groups, to input sales bids in the appropriate input column 40C. A reference numeral 40*d* indicates a list of purchase bids.

Also, if, for example, a free market is provided with an expanded time range of 05:00 through 22:00 of August 31st, the airline company can sell preferentially such times that have relatively many vacant seats. Further, such a market system as shown in FIG. 14 may be used in sales, to contain in groups registration those bids registered in the market system.

Thus, by a sale system in a communication network according to the preferred embodiment of the invention, a mediator in the network receives purchase bids for a desired commodity from a purchaser and also sales bids for a desired commodity from a seller at the same time as posting or presenting the results of both parties to them, wherein the conditions of the purchaser or seller whichever earlier in bidding are always announced, so that if the conditions of the later bidder match with the above-mentioned conditions, a transaction is concluded and the transaction information is announced, and the mediator receives changes in the seller's unconcluded conditions and those in the purchaser's unconcluded conditions to announce the unconcluded bids in order to continuously receive responding bids of other purchasers and sellers and thereby always enable participation under one's own desired conditions, thus eliminating the bidding period in contrast to general auctions to give chances to the selecting purchasers and sellers to sell and purchase commodities at the lowest purchase price and the highest sales price respectively. Also, the later bidder can win a bid immediately by providing a lowest desired price acceptable in transaction conclusion and so need not consecutively monitor the bidding state until the bid is expired.

In particular, in contrast to general auctions where earlier bidders are restricted in changing the conditions, by the invention, it is possible to change the bidding conditions to one's satisfaction in participation of bids for his desired and acceptable price and, further, a seller can use besides the above-mentioned sales system such a sales method, for example, as an over-the-counter sales system, to correct his bidding conditions if the number of articles is decreased due to sales or increased by arrival of commodities to thereby expand the sales route, thus facilitating the participation of the sellers. Further, both of sellers and purchasers make response bids for one kind of commodities, to form a fair market price in many cases.

EXPLANATION OF REFERENCE NUMERALS

20 registration group inputting column,
31 registration group type column,
32, 33, 34 bid contents display column,
32*a*, 33*a*, 34*a* purchase desired price inputting column,
32*b*, 33*b*, 34*b* quantity inputting column.

FIG. 1
1 S1
Inputting ID
2 Inputting of ID and password of individual and corporation purchase wisher
3 Inputting of ID and password of corporation sales wisher
4 Sales wisher A
5 Mediator I
6 Sales wisher X
7, 7' Display (announcement) of sales desired information, purchase desired information, and other transaction-conclusion information
8, 8' Display (announcement) of sales desired information, purchase desired information, and other transaction-conclusion information
9 Decide by ID
10 S2-1 Individual purchaser dedicated input screen
Input desired commodity, price, and presentation period
11 S2-2 Corporation purchaser dedicated input screen
Input desired commodity, price, and presentation period
12 S3
Presenting of conditions to mediator
13 Presenting of purchase wish
14 Presenting of sales wish
15 S4
Reviewing of desired conditions
16 Presenting of purchase wish and changes, left as is unless changed or cancelled
17 Conditions changed?
18 During desired announcement period?
19 Cancel presentation
20 Change conditions
21 Desired announcement period expired FIG. 2
1 S5
List of desired information
2 Purchase wisher A
3 Mediator
4 Sales wisher X
5, 6 Display (announcement) of sales desired information, purchase desired information, and other transaction-conclusion information
7 S61 Transaction concluded
8 Transaction concluded based on conditions?
9 S62 Transaction concluded
10 S7
Posting and receiving of commission
11 Paying of commission (no commission unless cancelled)
12 Paying of commission
13, 14 Posting of transaction conclusion and seller information
Display (announcement) of sales desired information, purchase desired information, and other transaction-conclusion information

15 No cancellation?
16 Only purchaser pay commission to mediator (seller has already paid)
17 S8
Commodity and charge
18 Purchaser
19 Paying of charge
20 Delivery of commodity
21 Seller
22 Cooling-off FIG. 3
1 Input ID
2 S2
Registering of bidding conditions
3 Select category
4 Select participation market
5 Independent market
6 Unified market
7 Bidder's name presented?
8 Input commodity details etc.
9 Present list of bidders
10 Transfer-input unified conditions
11 Input bid desired price
12 Concluded?
13 S4
Presenting and reviewing of conditions
14 Purchase wisher A
Mediator
16 Sales wisher X
17, 17' display (announcement) of sales desired information, purchase desired information, and other transaction-conclusion information
18 Same groups present other than concluded group?
19 Cancel same groups other than concluded one
20 Start negotiation or pay charge
21 No change?
22 During presentation period?
23 Presentation cancelled?
24 Cancel order FIG. 4
1 Item code
2 Item name
3 Maker
4 Specifications 1
5, 5' Information
6 Video memory: 25 MB
CD-RW
Color etc.
7 Specify delivery time limit clearly
8 Ordinary registration
9 To shopping basket
10 Group registration
11 To basket a (Remains 1)
12 Decision button to the above-mentioned basket
13 Sales desired price Quantity
14 Purchase desired price Quantity
15 Ordinary registration
16 To shopping basket
17 Individual market
18 Free market
19 Market information
20 Product name/High price/Low price/Current price/Transaction quantity/Difference from previous day
21 * To five sales wishing companies and top five purchase wishers are displayed.
22 Sales desired price/Quantity/Purchase desired price/Quantity FIG. 5
1 Shopping basket a Cancel basket
2 Validity date: Aug. 29, 2000 Prolong validity date
3 Note: Bids other than a first won bid for the following commodities are cancelled.
4 Bidding destination Free market
5 Bidding destination Zekku Ltd.
6 Bidding destination Market Co., Ltd.
7 Sony personal computer
8 Sharp personal computer
9 Fujitsu personal computer
10, 10' Change/Purchase desires price/Quantity
Cancel FIG. 6
1 Shopping basket a Cancel basket
2 Validity date: Aug. 25, 2000 Prolong validity date
3 Quantity change
4 Bidding destination Free market
5 Bidding destination Zekku Ltd.
6 Bidding destination Market Co., Ltd.
7 Bidding quantity (remains)
If this quantity is won in bidding, the remaining bids are cancelled.
8, 8' Alkali battery, UM3
9, 9' Change/Purchase desired price/Quantity
10 Cancel
11 Total number of concluded transactions
12, 12' Number of concluded transactions
13 Market information
14 Sales desired price/Quantity
15, 15' Purchase desired price/Quantity FIG. 7
1 Total number of concluded transactions
2, 2' Number of concluded transactions FIG. 8
1 Purchaser code/Market type/Free market/Individual sales Individual purchase/Paying type/Transfer/Cash on delivery/Credit
2 Management No./Item code (Link to commodity details)/Commodity name/Traction concluded date/Purchaser code (Link to purchaser)/Concluded price/Quantity/Delivery fee/Consumption tax/Total amount Pay/Payment check/Delivery check FIG. 9
1 Stage
2 Detail screen
3 Seat height
Seat width
Distance to seat ahead
Photo of stage scenery taken from this seat and photo of this seat
4 Sales desired price/Quantity
5 Purchase desired price/Quantity
6 Registration
7 To box a (Free market, individual sales)
8 To the above-mentioned box
9 Concert hall etc.

FIG. 10
1 8'th floor Room No. 801
2 Elevator
3, 3' Grand bath, playroom, sales store
4 Front desk, reception on 1'st floor

5 Intra-room photo
6 Room layout, intra-room provisions
7 Through-the-window scenery photo
8 Sales desired price Quantity
9 Purchase desired price Quantity
10 Group registration
To box a (Free market, individual sales)
To the above-mentioned box
11 Hotel etc.

FIG. 11
1 Site A
2 Seat No.

FIG. 12
1 Two-persons room

FIG. 13
1 1 box
2, 2' Individual market
3 Two-persons room
Code No.: 00-8-19-101-2
4 Three-persons room
Code No.: 8-19-101-3
5 Quantity change
6, 6' Cancel Change
7 Sales quantity
8, 8' Purchase desired price
9, 9' Quantity
10 Remains
11 Total number of concluded transactions
12, 12' Number of concluded transactions FIG. 14
1 From Nagoya to Tokyo (Komaki airport)
2 Current price
3 Transaction quantity
4 Difference from previous day
5 Airplane ticket
6 Purchase desired price
7, 7' Quantity FIG. 15
1 No-smoking seat ABA
1' Smoking seat ABA
2, 2' Company introduction
3, 3' Almost the same conditions as current sales are displayed.
Airport, from-Nagoya-to-Tokyo, presentation period, etc. are displayed.
On week days from 7/1 to 7/31
4, 4' Sales desired price
5, 5' Ordinary registration
Sales box
6, 6' Purchase desired price Number of persons
7, 7' Group registration
To box a (Remains 1)
To the above-mentioned box

What is claimed:

1. A sales system in a computer network comprising:
means for a mediator in said computer network to receive a bid from a first buyer, said bid comprising a quantity of an arbitrary desired commodity for an arbitrary desired purchase price;
means for said mediator in said computer network to receive an offer from a first seller, said offer comprising a quantity of an arbitrary desired commodity for an arbitrary desired price;
means for said mediator to present said bid and said offer to said first buyer and said first seller;
means for said mediator to announce said bid and said offer, such that if conditions of a second seller or a second buyer match said bid or said offer respectively, a transaction is concluded and conclusion information thereof is always announced;
means for said mediator to receive changes to said first seller's unconcluded offer and changes to said first buyer's unconcluded bid;
means for said mediator to announce said unconcluded offer including said changes and said unconcluded bid including said changes;
means for said mediator to receive a bid from a third buyer, said bid corresponding to said unconcluded offer and changes;
means for said mediator to receive an offer from a third seller, said offer corresponding to said unconcluded bid and changes;
means for said first buyer or said first seller to enter a plurality of bids or offers and the desired number of bids or offers to be concluded in at least one transaction regardless of the desired commodity from one data entry screen;
means for correlatively registering said plurality of bids or offers with said data entry screen;
means for assigning a correlated register symbol to each of the plurality of registered bids or offers entered on said data entry screen to respond to bids from other buyers and sellers separately from commodity names; and
means for retrieving and canceling bids or offers having correlated register symbols on said data entry screen, without concluding at least one transaction if a desired number of bids or offers of said plurality of bids or offers are concluded in at least one transaction.

2. A sales system in a computer network comprising:
means for a mediator in said computer network to receive a bid from a first buyer, said bid comprising a quantity of an arbitrary desired commodity for an arbitrary desired purchase price;
means for said mediator in said computer network to receive an offer from a first seller, said offer comprising a quantity of an arbitrary desired commodity for an arbitrary desired price;
means for said mediator to present said bid and said offer to said first buyer and said first seller;
means for said mediator to announce said bid and said offer, such that if conditions of a second seller or a second buyer match said bid or said offer respectively, a transaction is concluded and conclusion information thereof is always announced;
means for said mediator to receive changes to said first seller's unconcluded offer and changes to said first buyer's unconcluded bid;
means for said mediator to announce said unconcluded offer including said changes and said unconcluded bid including said changes;
means for said mediator to receive a bid from a third buyer, said bid corresponding to said unconcluded offer and changes;
means for said mediator to receive an offer from a third seller, said offer corresponding to said unconcluded bid and changes;
means for said first buyer or said first seller to enter a plurality of bids or offers and the desired number of bids or offers to be concluded in at least one transaction regardless of the desired commodity from one data entry screen;

means for correlatively registering said plurality of bids or offers with said data entry screen;

means for assigning a correlated register symbol to each of the plurality of registered bids or offers entered on said data entry screen to respond to bids from other buyers and sellers separately from commodity names;

means for retrieving and canceling bids or offers having correlated register symbols on said data entry screen, without concluding at least one transaction if a desired number of bids or offers of said plurality of bids or offers are concluded in at least one transaction; and means for retrieving and canceling bids or offers having correlated register symbols from other computer networks on said data entry screen, without concluding at least one transaction if a desired number of bids or offers of said plurality of bids or offers are concluded in at least one transaction.

3. A sales system in a computer network according to claim 1, further comprising:

means for providing an index for bids or offers with the same correlated register symbols in a file;

means for retrieving said index referring to the specified information of the other bids or offers which are added to a plurality of bids registered in groups when a transaction is concluded; and means for retrieving other bids or offers referring to the specified information of the other bids which are added to a plurality of bids registered in groups when a transaction is concluded.

4. A sales system in a computer network according to claim 2, further comprising:

means for providing an index for bids or offers with the same correlated register symbols in a file;

means for retrieving said index referring to the specified information of the other bids or offers which are added to a plurality of bids registered in groups when a transaction is concluded; and means for retrieving other bids or offers referring to the specified information of the other bids which are added to a plurality of bids registered in groups when a transaction is concluded.

5. A sales system in a computer network according to claim 1, further comprising:

means for entering a total quantity of said arbitrary commodity into a total entering column;

means for determining if the total quantity entered in said total entering column exceeds the quantity of said commodity offered for sale or purchase;

means for requiring re-entry of a total quantity of said arbitrary commodity into a total entering column if the total quantity entered in said total entering column exceeds the quantity of said commodity offered for sale or purchase; and means for retrieving and canceling unconcluded bids or offers having correlated register symbols if the transaction for the quantity of said commodity offered for sale or purchase is concluded.

6. A sales system in a computer network according to claim 2, further comprising:

means for entering a total quantity of said arbitrary commodity into a total entering column;

means for determining if the total quantity entered in said total entering column exceeds the quantity of said commodity offered for sale or purchase;

means for requiring re-entry of a total quantity of said arbitrary commodity into a total entering column if the total quantity entered in said total entering column exceeds the quantity of said commodity offered for sale or purchase; and means for retrieving and canceling unconcluded bids or offers having correlated register symbols if the transaction for the quantity of said commodity offered for sale or purchase is concluded.

7. A method of providing a sales system in a computer network comprising the steps of:

sending a bid from a first buyer to a mediator in said computer network, said bid comprising a quantity of an arbitrary desired commodity for an arbitrary desired purchase price;

sending an offer from a first seller to a mediator in said computer network, said offer comprising a quantity of an arbitrary desired commodity for an arbitrary desired price;

presenting said bid and said offer to said first buyer and said first seller;

announcing said bid and said offer, such that if conditions of a second seller, or a second buyer match said bid or said offer respectively, a transaction is concluded and conclusion information thereof is always announced;

sending changes to said first seller's unconcluded offer and changes to said first buyer's unconcluded bid to said mediator;

announcing said unconcluded offer including said changes and said unconcluded bid including said changes;

sending a bid from a second buyer to said mediator, said bid corresponding to said unconcluded offer and changes;

sending an offer from a second seller to said mediator, said offer corresponding to said unconcluded bid and changes;

entering a plurality of bids or offers by said first buyer or said first seller, respectively, and the desired number of bids or offers to be concluded in at least one transaction regardless of the desired commodity from one data entry screen;

correlatively registering said plurality of bids or offers with said data entry screen;

assigning a correlated register symbol to each of the plurality of registered bids or offers entered on said data entry screen to respond to bids from other buyers and sellers separately from commodity names; and retrieving and canceling bids or offers having correlated register symbols on said data entry screen, without concluding at least one transaction if a desired number of bids or offers of said plurality of bids or offers are concluded in transaction.

8. A method of providing a sales system in a computer network comprising the steps of:

sending a bid from a first buyer to a mediator in said computer network, said bid comprising a quantity of an arbitrary desired commodity for an arbitrary desired purchase price;

sending an offer from a second seller to a mediator in said computer network, said offer comprising a quantity of an arbitrary desired commodity for an arbitrary desired price;

presenting said bid and said offer to said first buyer and said first seller;

announcing said bid and said offer, such that if conditions of a second seller, or a second buyer match said bid or said offer respectively, a transaction is concluded and conclusion information thereof is always announced;

sending changes to said first seller's unconcluded offer and changes to said first buyer's unconcluded bid to said mediator;

announcing said unconcluded offer including said changes and said unconcluded bid including said changes;

sending a bid from a second buyer to said mediator, said bid corresponding to said unconcluded offer and changes;

sending an offer from a second seller to said mediator, said offer corresponding to said unconcluded bid and changes;

entering a plurality of bids or offers by said first buyer or said first seller, respectively, and the desired number of bids or offers to be concluded in at least one transaction regardless of the desired commodity from one data entry screen;

correlatively registering said plurality of bids or offers with said data entry screen;

assigning a correlated register symbol to each of the plurality of registered bids or offers entered on said data entry screen to respond to bids from other buyers and sellers separately from commodity names;

retrieving and canceling bids or offers having correlated register symbols on said data entry screen, without concluding at least one transaction if a desired number of bids or offers of said plurality of bids or offers are concluded in transaction; and retrieving and canceling bids or offers having correlated register symbols from other computer networks on said data entry screen, without concluding a transaction if a desired number of bids or offers of said plurality of bids or offers are concluded in at least one transaction.

9. A method of providing a sales system in a computer network according to claim 7, further comprising the steps of:

providing an index for bids or offers with the same correlated register symbols in a file;

retrieving said index referring to the specified information of the other bids or offers which are added to a plurality of bids registered in groups when a transaction is concluded; and retrieving other bids or offers referring to the specified information of the other bids which are added to a plurality of bids registered in groups when a transaction is concluded.

10. A method of providing a sales system in a computer network according to claim 8, further comprising the steps of:

providing an index for bids or offers with the same correlated register symbols in a file;

retrieving said index referring to the specified information of the other bids or offers which are added to a plurality of bids registered in groups when a transaction is concluded; and retrieving other bids or offers referring to the specified information of the other bids which are added to a plurality of bids registered in groups when a transaction is concluded.

11. A method for providing a sales system in a computer network according to claim 7, further comprising the steps of:

entering a total quantity of said arbitrary commodity into a total entering column;

determining if the total quantity entered in said total entering column exceeds the quantity of said commodity offered for sale or purchase;

requiring re-entry of a total quantity of said arbitrary commodity into a total entering column if the total quantity entered in said total entering column exceeds the quantity of said commodity offered for sale or purchase; and retrieving and canceling unconcluded bids or offers having correlated register symbols if the transaction for the quantity of said commodity offered for sale or purchase is concluded.

12. A method of providing a sales system in a computer network according to claim 8, further comprising the steps of:

entering a total quantity of said arbitrary commodity into a total entering column;

determining if the total quantity entered in said total entering column exceeds the quantity of said commodity offered for sale or purchase;

requiring re-entry of a total quantity of said arbitrary commodity into a total entering column if the total quantity entered in said total entering column exceeds the quantity of said commodity offered for sale or purchase; and retrieving and canceling unconcluded bids or offers having correlated register symbols if the transaction for the quantity of said commodity offered for sale or purchase is concluded.

* * * * *